United States Patent
Hiramaki et al.

(10) Patent No.: US 9,020,199 B2
(45) Date of Patent: Apr. 28, 2015

(54) EYELID DETECTION DEVICE, EYELID DETECTION METHOD, AND RECORDING MEDIUM

(75) Inventors: Takashi Hiramaki, Nagoya (JP); Atsushi Nakabayashi, Anjo (JP); Masayuki Usami, Nagoya (JP); Tamiko Nishina, Nisshin (JP); Hiroaki Iida, Hashima (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 30 days.

(21) Appl. No.: 14/112,461

(22) PCT Filed: Apr. 19, 2011

(86) PCT No.: PCT/JP2011/059663
§ 371 (c)(1),
(2), (4) Date: Oct. 17, 2013

(87) PCT Pub. No.: WO2012/144020
PCT Pub. Date: Oct. 26, 2012

(65) Prior Publication Data
US 2014/0161317 A1    Jun. 12, 2014

(51) Int. Cl.
*G06K 9/00* (2006.01)
(52) U.S. Cl.
CPC .......... *G06K 9/00845* (2013.01); *G06K 9/0061* (2013.01)
(58) Field of Classification Search
None
See application file for complete search history.

(56) References Cited

U.S. PATENT DOCUMENTS

| | | | |
|---|---|---|---|
| 7,784,943 B2 | 8/2010 | Adachi et al. | |
| 2003/0169907 A1* | 9/2003 | Edwards et al. | 382/118 |
| 2008/0049185 A1* | 2/2008 | Huffman et al. | 351/206 |
| 2008/0151186 A1* | 6/2008 | Adachi et al. | 351/206 |
| 2008/0226175 A1 | 9/2008 | Suzuki et al. | |

(Continued)

FOREIGN PATENT DOCUMENTS

| | | |
|---|---|---|
| JP | 2002-362647 A | 12/2002 |
| JP | 2004-192552 A | 7/2004 |

(Continued)

OTHER PUBLICATIONS

Sadasuke et al. Translation of Japanese Publicaition JP2008-167806, originally cited by applicant in IDS submitted on Oct. 17, 2013, Translation obtained using Patent Abstracts of Japan (PAJ), Date Accessed Jan. 11, 2015.*

Sadasuke et al. Translation of Japanese Publicaition JP2008-171065, originally cited by applicant in IDS submitted on Oct. 17, 2013, Translation obtained using Patent Abstracts of Japan (PAJ), Date Accessed Jan. 11, 2015.*

(Continued)

*Primary Examiner* — Tahmina Ansari
(74) *Attorney, Agent, or Firm* — Sughrue Mion, PLLC

(57) ABSTRACT

A secondary curve, the ends of which coincide with the inner corner and the outer corner of the eye, is determined successively, and the total of the edge values of the pixels overlapping the secondary curve is calculated as an evaluation value. Next, a characteristic curve is generated on the basis of data made up of the calculated evaluation value and the Y-coordinate of the intersection between the secondary curve and a straight line passing through the center of a line segment whose ends coincide with the inner corner and the outer corner of the eye. Then, the reference positions for the upper eyelid and the lower eyelid of the eye are set on the basis of the result of an attempt to detect a pixel group occurring because of the red-eye effect in a search area defined on the basis of peaks in the characteristic curve.

13 Claims, 18 Drawing Sheets

(56) References Cited

U.S. PATENT DOCUMENTS

| | | |
|---|---|---|
| 2010/0094176 A1 | 4/2010 | Ohue et al. |
| 2013/0101225 A1* | 4/2013 | Kadoya et al. ............ 382/199 |
| 2014/0056529 A1* | 2/2014 | Ruan et al. ............... 382/199 |
| 2014/0072230 A1* | 3/2014 | Ruan et al. ............... 382/199 |

FOREIGN PATENT DOCUMENTS

| | | |
|---|---|---|
| JP | 2008-158922 A | 7/2008 |
| JP | 2008-167806 A | 7/2008 |
| JP | 2008-171065 A | 7/2008 |

OTHER PUBLICATIONS

Zheng, Zhonglong, Jie Yang, and Limin Yang. "A robust method for eye features extraction on color image." Pattern Recognition Letters 26.14 (2005): 2252-2261.*

International Search Report of PCT/JP2011/059663 dated May 31, 2011.

U.S. Appl. No. 13/805,597, filed Dec. 19, 2012, in the name of Akira Kadoya.

* cited by examiner

FIG.5A

HORIZONTAL EDGE DETECTION
OPERATOR

| 1  | 2  | 1  |
|----|----|----|
| 0  | 0  | 0  |
| −1 | −2 | −1 |

FIG.5B

VERTICAL EDGE DETECTION
OPERATOR

| 1 | 0 | −1 |
|---|---|----|
| 2 | 0 | −2 |
| 1 | 0 | −1 |

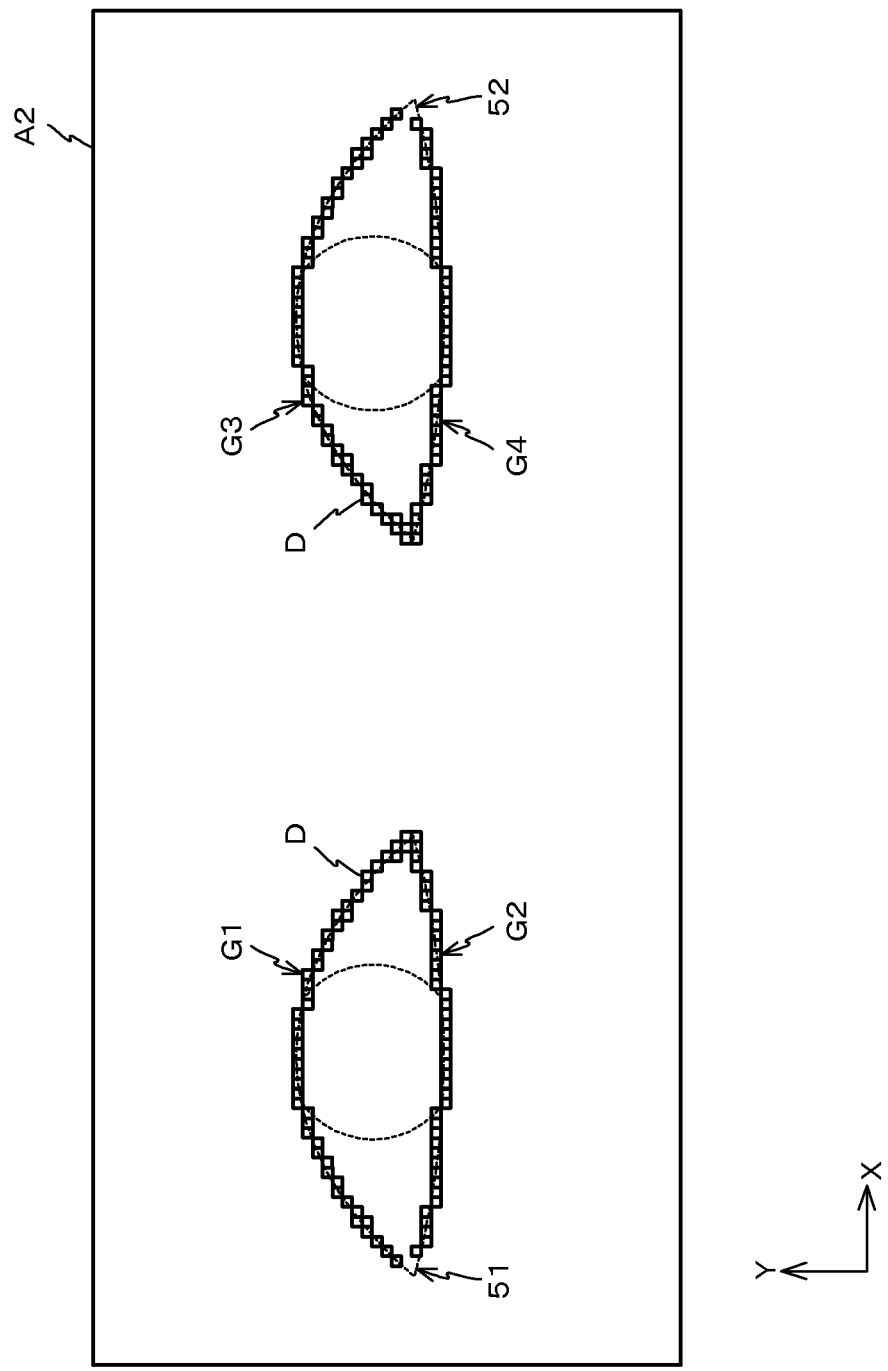

EYELID DETECTION DEVICE, EYELID DETECTION METHOD, AND RECORDING MEDIUM

CROSS REFERENCE TO RELATED APPLICATIONS

This is a National Stage of International Application No. PCT/JP2011/059663 filed Apr. 19, 2011, the contents of all of which is incorporated herein by reference in its entirety.

TECHNICAL FIELD

The present invention relates to an eyelid detection device, an eyelid detection method, and a recording medium, and more particularly, to an eyelid detection device that detects eyelids depicted in an image of the eyes, and to an eyelid detection method and a recording medium storing a program for detecting eyelids depicted in an image of the eyes.

BACKGROUND ART

Recently, traffic accident fatalities tend to be decreasing, but the number of incidents still remains at a high level. Although the causes of accidents are various, driving a vehicle while the driver is in a state of decreased alertness, such as being asleep at the wheel, is one factor that leads to accidents.

Consequently, various technologies for precisely detecting decreases in a driver's alertness have been proposed (see Patent Literature 1, for example).

CITATION LIST

Patent Literature

PLT 1: Unexamined Japanese Patent Application Kokai Publication No. 2004-192552.

SUMMARY OF INVENTION

Technical Problem

The device disclosed in Patent Literature 1 comprehensively determines whether or not a driver's eyes are closed, on the basis of the vertical size of the eyes depicted in an image of the driver's face, the distance between a curve following the upper eyelid and a line joining both ends of the curve, and the curve's radius of curvature.

In order to determine whether or not a driver's eyes are closed on the basis of an image of the eyes, it is necessary to accurately detect the edges of the eyelids from the image. However, if the so-called red-eye effect occurs during imaging, edges due to the red-eye effect potentially also occur near the edges of the eyelids. Also, in cases where the subject of imaging is wearing eye shadow, the luma of the pixels constituting an image of the eyes and their surroundings potentially become uniform. In such cases, accurately detecting the edges of the eyelids becomes no longer possible, and as a result, precisely determining whether or not a driver's eyes are closed becomes no longer possible.

The present invention, being devised in light of the above circumstances, takes as an object to precisely determine whether or not a driver's eyes are closed, on the basis of an image of the driver's eyes.

Solution to Problem

In order to achieve the above object, an eyelid detection device according to a first aspect of the present invention is provided with:

a edge value calculator that calculates edge values for pixels constituting an image depicting a driver's eye;

a evaluation value calculator that successively defines a fitting curve, one end of which coincides with an inner corner of the eye depicted in the image, and the other end of which coincides with an outer corner of the eye depicted in the image, and calculates an evaluation value indicating a degree to which the fitting curve coincides with an edge of an eyelid of the eye;

a characteristic curve generator that generates a characteristic curve indicating change in the evaluation value, on the basis of computation results from the evaluation value calculator;

a determinator that, in the case of detecting two peaks whose vertices are maxima of the characteristic curve, or in the case of detecting two peaks whose vertices are minima of the characteristic curve, determines whether or not an area on the image defined by the two peaks includes an area occurring because of a red-eye effect; and a setter that sets a reference position for the eyelid, on the basis of a determination result from the determinator.

An eyelid detection method according to a second aspect of the present invention includes:

calculating edge values of pixels constituting an image depicting a driver's eye;

defining a fitting curve, one end of which coincides with an inner corner of the eye depicted in the image, and the other end of which coincides with an outer corner of the eye depicted in the image;

calculating an evaluation value indicating a degree to which the fitting curve coincides with an edge of an eyelid of the eye;

generating a characteristic curve indicating change in the evaluation value, on the basis of the computation results from the evaluation value;

in the case of detecting two peaks whose vertices are maxima of the characteristic curve, or in the case of detecting two peaks whose vertices are minima of the characteristic curve, determining whether or not an area on the image defined by the two peaks includes an area occurring because of a red-eye effect; and setting a reference position for the eyelid, on the basis of a result from the determination.

A recording medium storing a program according to a third aspect of the present invention causes a computer to execute a procedure including:

calculating edge values of pixels constituting an image depicting a driver's eye;

defining a fitting curve, one end of which coincides with an inner corner of the eye depicted in the image, and the other end of which coincides with an outer corner of the eye depicted in the image;

calculating an evaluation value indicating a degree to which the fitting curve coincides with an edge of an eyelid of the eye;

generating a characteristic curve indicating change in the evaluation value, on the basis of the computation results from the evaluation value ;

in the case of detecting two peaks whose vertices are maxima of the characteristic curve, or in the case of detecting two peaks whose vertices are minima of the characteristic curve, determining whether or not an area on the image defined by the two peaks includes an area occurring because of a red-eye effect; and setting a reference position for the eyelid, on the basis of a result from the determination.

Advantageous Effects of Invention

According to the present invention, an evaluation value is calculated for a fitting curve successively defined by taking the inner corner and the outer corner of the eye as points of origin. Next, a pixel group occurring because of the red-eye effect, for example, is detected in an area defined by peaks in a characteristic curve indicating change in the evaluation value. Subsequently, reference positions for the edges of the eyelids are set while taking into account the pixel group detection results. For this reason, it is possible to precisely set reference positions for the eyelids, even when the so-called red-eye effect or the like occurs during imaging and edges other than the edges of the eyelids are produced near the edges of the eyelids. Thus, it becomes possible to precisely determine whether or not a driver's eyes are closed, and precisely detect the eyes' degree of opening.

BRIEF DESCRIPTION OF DRAWINGS

FIG. 5A is a diagram illustrating a horizontal edge detection operator;

FIG. 5B is a diagram illustrating a vertical edge detection operator;

FIG. 6 is a diagram illustrating pixels constituting upper eyelid and lower eyelid edges;

DESCRIPTION OF EMBODIMENTS (First Embodiment)

Figure 1:
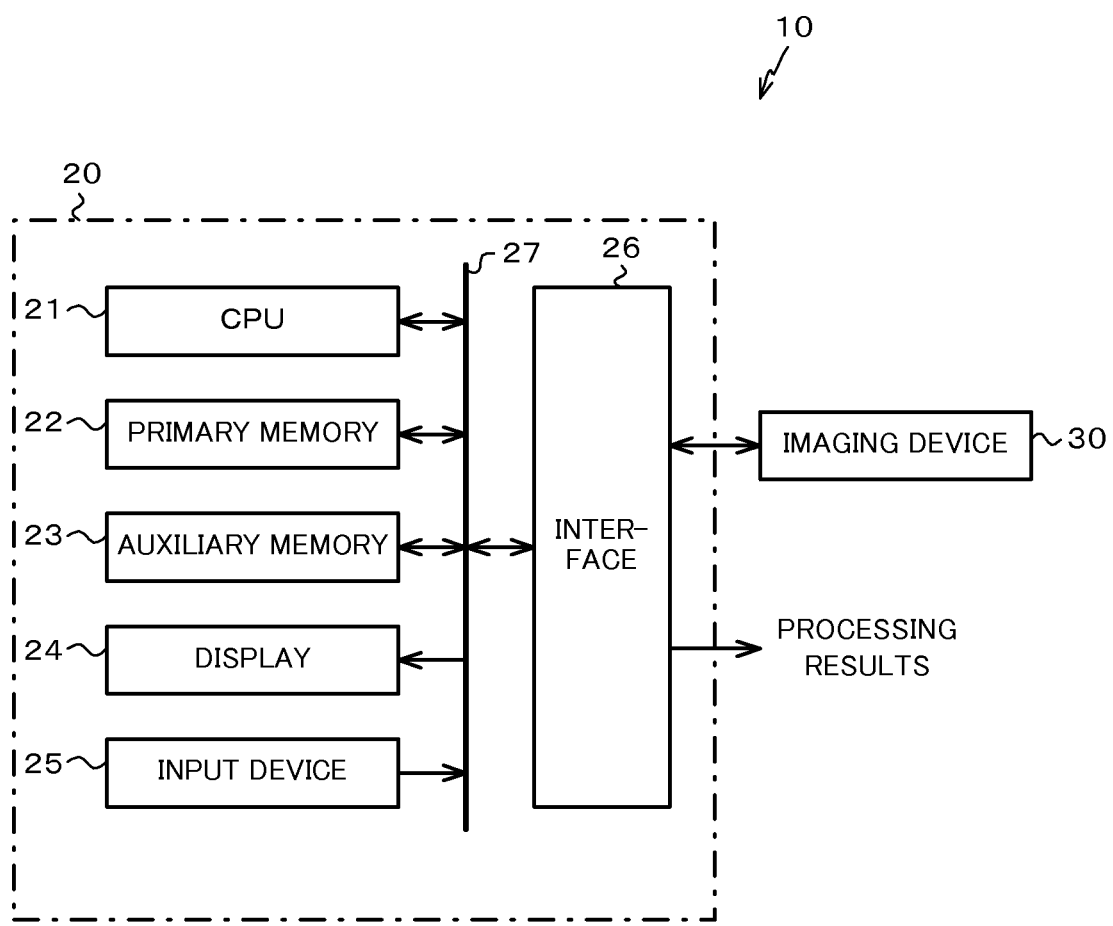
FIG. 1 is a block diagram of an eyelid detection device according to the first embodiment.

Hereinafter, the first embodiment of the present invention will be described with reference to the drawings. FIG. 1 is a block diagram illustrating a schematic configuration of an eyelid detection device 10 according to the present embodiment. The eyelid detection device 10 is a device that calculates a degree of opening of a driver's eyes, on the basis of an image depicting the driver's face. As illustrated in FIG. 1, the eyelid detection device 10 includes a calculating device 20 and an imaging device 30.

Figure 2:
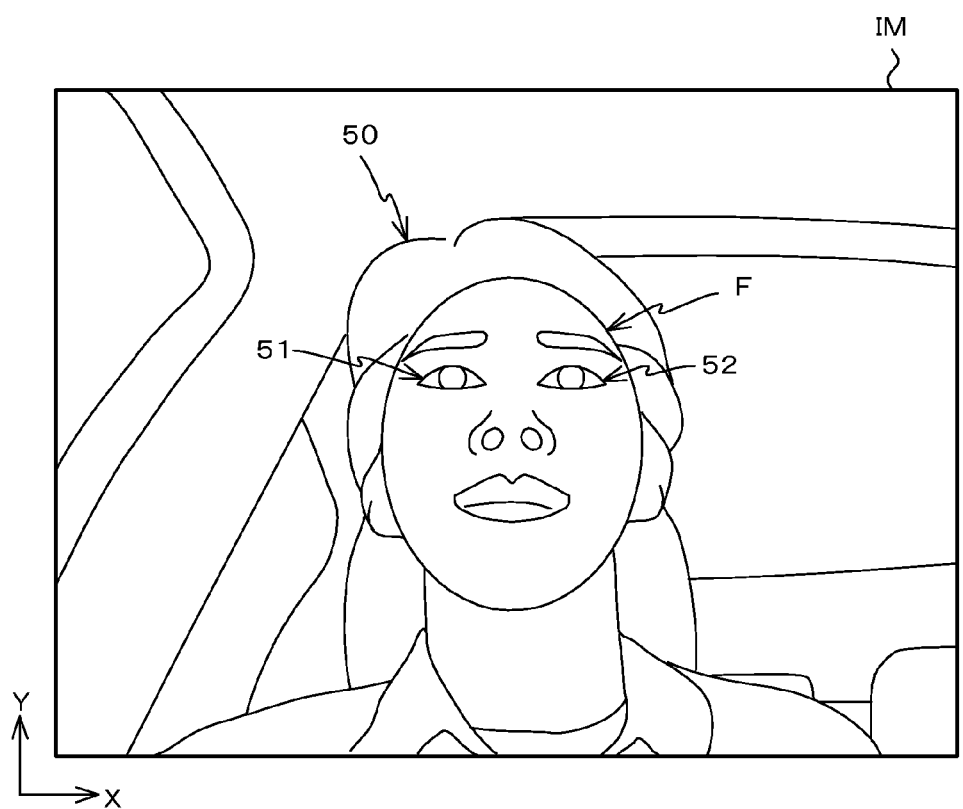
FIG. 2 is a diagram illustrating an image captured by an imaging device.

The imaging device 30 is a device that converts and outputs an image acquired by imaging a subject as an electrical signal. FIG. 2 illustrates an image IM captured by the imaging device 30. As the image IM demonstrates, the imaging device 30 is attached to the top of the steering column or the steering wheel, for example, with the installation angle and the angle of view adjusted such that the face of a driver 50 seated in the driver's seat of a vehicle is positioned in approximately the center of the field of view. In addition, the imaging device 30 captures images of the face of the driver 50 at a given interval, and outputs information regarding the images obtained by capturing to the calculating device 20.

Herein, for the sake of convenience, an XY coordinate system with the origin at the lower-left corner of the image IM will be defined, and the description hereinafter will use this XY coordinate system where appropriate.

Returning to FIG. 1, the calculating device 20 is a computer that includes a central processing unit (CPU) 21, primary memory 22, auxiliary memory 23, a display 24, an input device 25, and an interface 26.

The CPU 21 retrieves and executes programs stored in the auxiliary memory 23. Specific operations by the CPU 21 will be discussed later.

The primary memory 22 includes volatile memory such as random access memory (RAM). The primary memory 22 is used as a work area for the CPU 21.

The auxiliary memory 23 includes non-volatile memory such as read-only memory (ROM), a magnetic disk, or semiconductor memory. The auxiliary memory 23 stores information such as programs that the CPU 21 executes, and various parameters. The auxiliary memory 23 also sequentially stores information, including information regarding images output from the imaging device 30, processing results by the CPU 21, and the like.

The display 24 includes a display unit such as a liquid crystal display (LCD). The display 24 displays information such as processing results from the CPU 21.

The input device 25 includes input keys and a pointing device such as a touch panel. Operator instructions are input via the input device 25 and reported to the CPU 21 via a system bus 27.

The interface 26 includes a serial interface, a local area network (LAN) interface, or the like. The imaging device 30 is connected to the system bus 27 via the interface 26.

Figure 3:
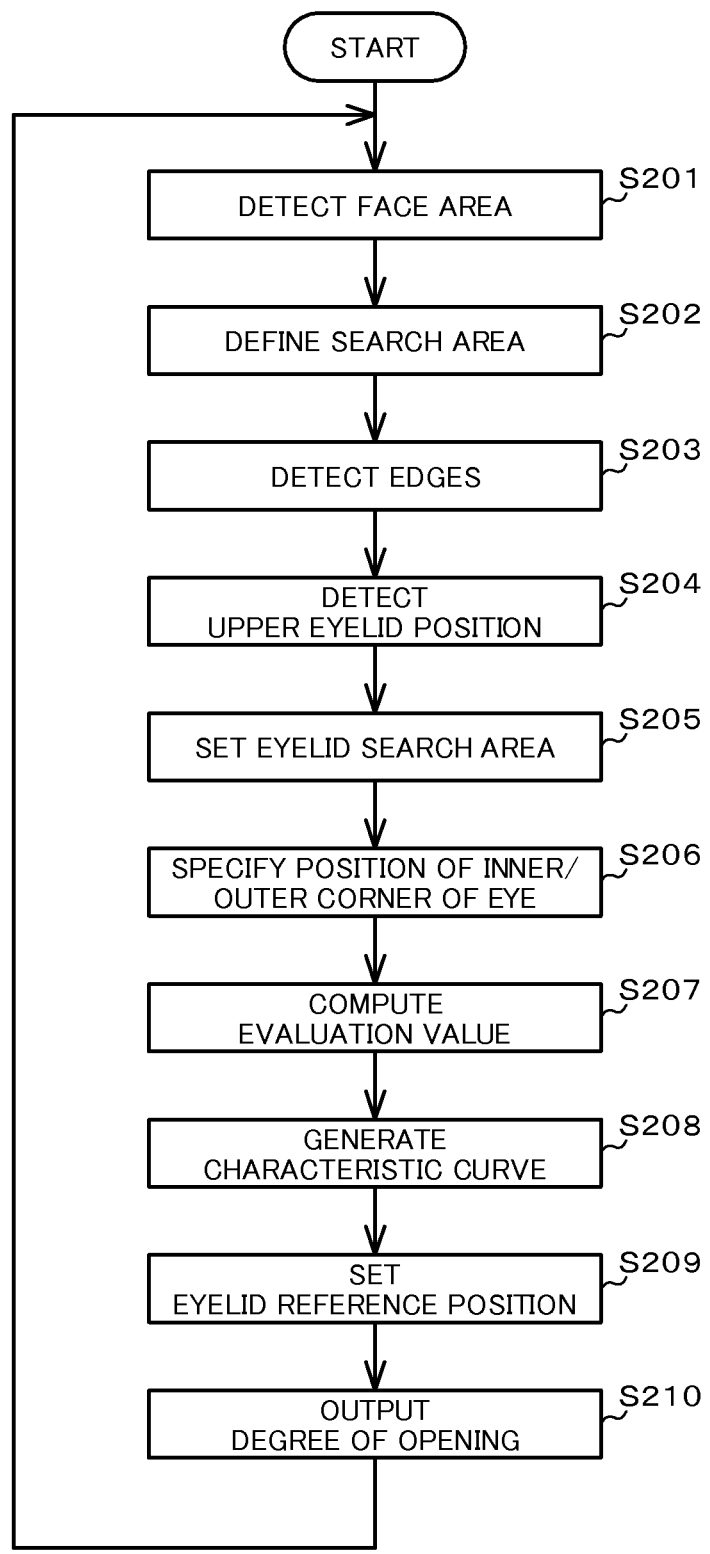
FIG. 3 is a flowchart illustrating a series of processing operations executed by a CPU.
Figure 4:
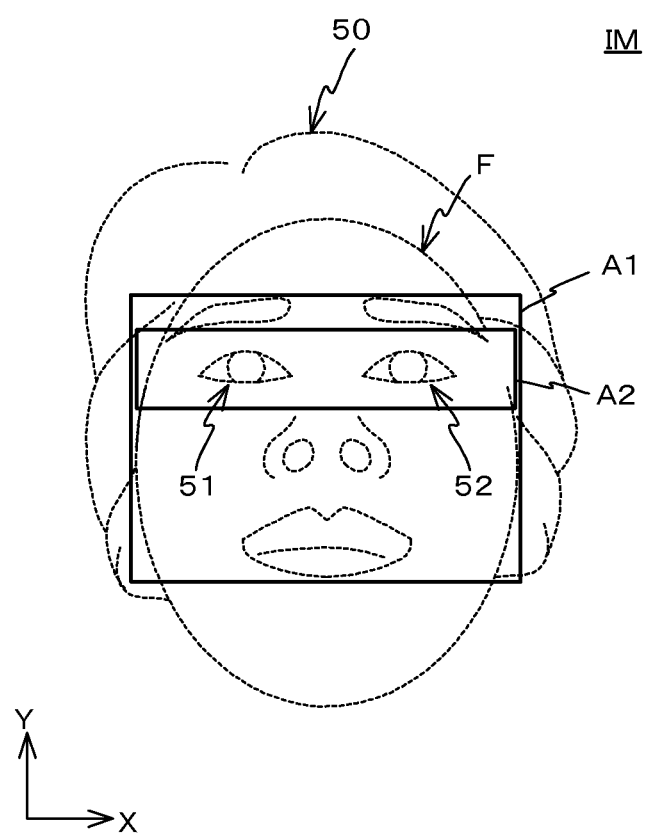
FIG. 4 is a diagram illustrating a face area and a search area.

The flowchart in FIG. 3 corresponds to a series of processing algorithms in a program executed by the CPU 21. Hereinafter, operations of the eyelid detection device 10 will be described with reference to FIG. 3. The series of processing operations illustrated by the flowchart in FIG. 3 is executed when the ignition switch of a vehicle is switched on, for example. In addition, assume herein that the image IM illustrated in FIG. 2 has been captured by the imaging device 30.

First, in the first step S201, the CPU 21 detects a face area A1 depicting features such as the eyes and nose constituting the face of the driver 50 from the image IM output from the imaging device 30.

The detection of the face area A1 involves first executing image processing using a Sobel filter on the image IM, and extracting edges included in the image IM. Next, the edges indicating the outline F of the face of the driver 50 are detected from among the extracted edges. Subsequently, the edges expressing the eyebrows and mouth of the driver 50 are detected from the edges included in the area enclosed by the outline F of the face of the driver 50, and the positions of the eyebrows and the mouth of the driver 50 are roughly determined. When the positions of the eyebrows and the mouth are determined, the CPU 21 detects the smallest square area that includes the eyebrows and the mouth of the driver 50, and whose size in the X-axis direction approximately matches the size of the outline F of the face, as the face area A1.

In the next step S202, the CPU 21 defines a search area A2 where the CPU 21 will perform an eyelid detection process. The relative positions of the eyebrows, eyes, nose, and mouth constituting the face are generally determinable on the basis of the face outline and parts such as the eyebrows or the eyes, allowing for some individual differences. Consequently, in the face area A1 defined such that the eyebrows are positioned at the top edge and the mouth is positioned at the bottom edge, the area where the eyes are positioned is determined with some degree of accuracy. Thus, the CPU 21 defines a rectangular search area A2 below the image of the eyebrows included in the face area A1, with the longer direction extending in the X-axis direction.

In the next step S203, the CPU 21 executes an edge detection process on the search area A2. During edge detection, the CPU 21 uses a horizontal edge detection operator illustrated in FIG. 5A, and a vertical edge detection operator illustrated in FIG. 5B.

For example, the CPU 21 first uses the horizontal edge detection operator to calculate an edge value for each pixel. This edge value becomes positive in the case where the pixel whose edge value is being calculated has a high pixel luma in the upper side (+Y side), and a low pixel luma in the lower side (−Y side). Also, the edge value becomes negative in the case where the pixel whose edge value is being calculated has a low pixel luma in the upper side (+Y side), and a high pixel luma in the lower side (−Y side). Thus, the CPU 21 extracts pixels whose edge value is equal to or greater than a first threshold value, and pixels whose edge value is less than or equal to a second threshold value.

Next, the CPU 21 uses the vertical edge detection operator to calculate an edge value for each pixel. This edge value becomes positive in the case where the pixel whose edge value is being calculated has a high pixel luma on the left side (−X side), and a low pixel luma on the right side (+X side). Also, the edge value becomes negative in the case where the pixel whose edge value is being calculated has a low pixel luma on the left side (−X side), and a high pixel luma on the right side (+X side). Thus, the CPU 21 extracts pixels whose edge value is equal to or greater than a first threshold value, and pixels whose edge value is less than or equal to a second threshold value.

Thus, as illustrated in FIG. 6, for example, pixels D constituting the edges of the upper eyelids and the lower eyelids of eyes 51 and 52 are extracted. Hereinafter, the edge of the upper eyelid of the right eye 51 will be designated the pixel group G1, while the edge of the lower eyelid will be designated the pixel group G2. Likewise, the edge of the upper eyelid of the left eye 52 will be designated the pixel group G3, while the edge of the lower eyelid will be designated the pixel group G4.

Figure 7:
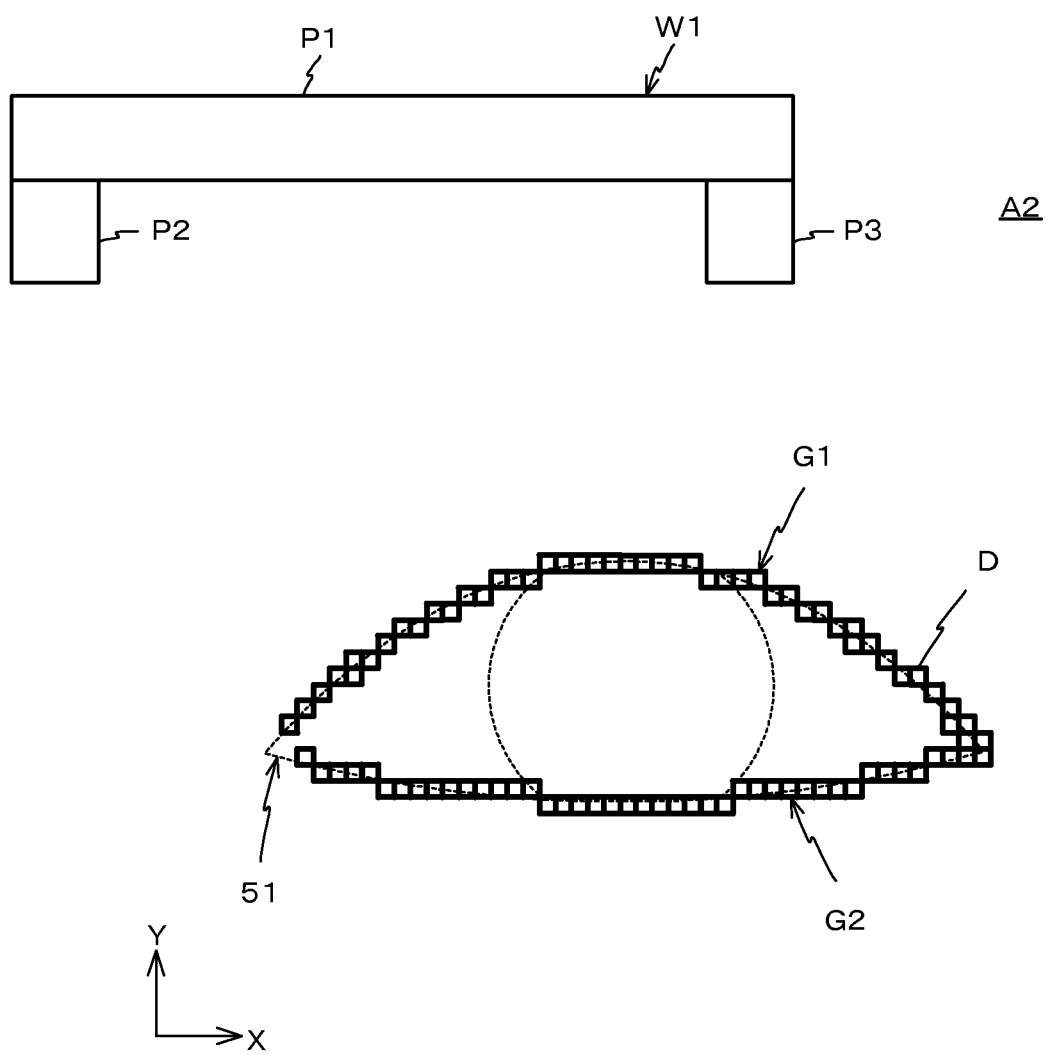
FIG. 7 is a diagram illustrating pixel groups and an upper eyelid search window.

In the next step S204, the CPU 21 detects the position of the upper eyelid by conducting a scan using an upper eyelid search window. FIG. 7 is a diagram illustrating the pixel groups G1 and G2, and an upper eyelid search window W1 for detecting the upper eyelid indicated by the pixel group G1. As illustrated in FIG. 7, the upper eyelid search window W1 is made up of a rectangular horizontal edge window P1 with the longer direction extending in the X-axis direction, and vertical edge windows P2 and P3 defined on both ends of the horizontal edge window P1.

The CPU 21 moves the upper eyelid search window W1 inside the search area A2 in distance increments corresponding to one pixel, for example. The CPU 21 then sequentially calculates the total of the sum of the edge values of the pixels D simultaneously overlapping the horizontal edge window P1, and the value obtained by subtracting the sum of the edge values of the pixels overlapping the vertical edge window P3 from the sum of the edge values of the pixels D overlapping the vertical edge window P2, as an evaluation value. Subsequently, the CPU 21 detects the position of the upper eyelid search window W1 when the evaluation value reaches a maximum as the position of the upper eyelid of the right eye 51.

Figure 8:
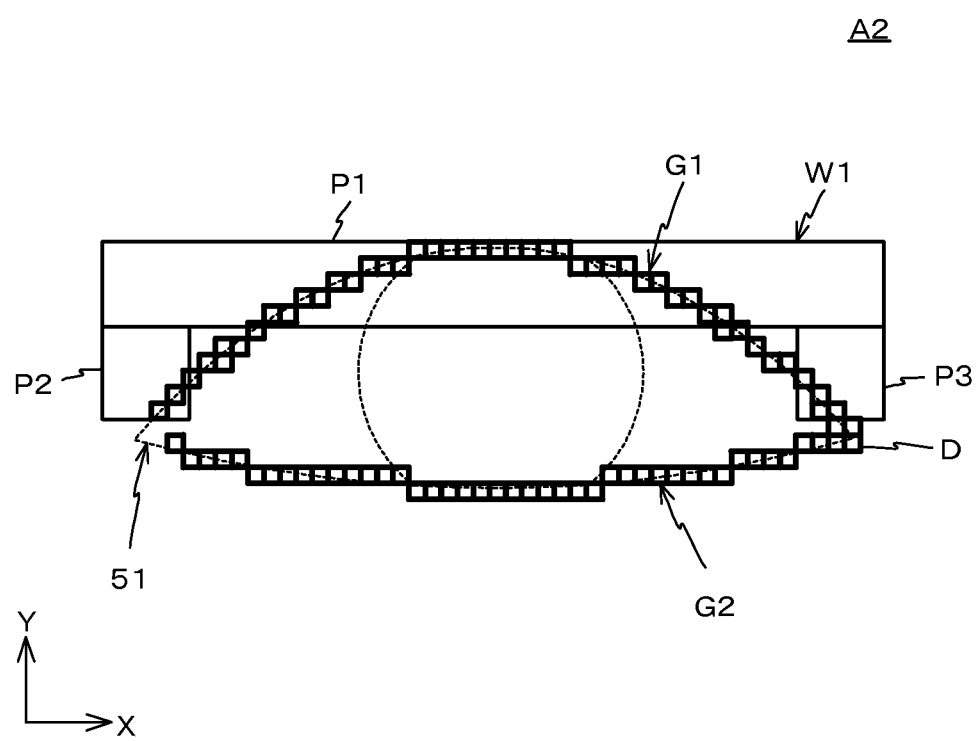
FIG. 8 is a diagram illustrating the relative positions of pixel groups and an upper eyelid search window when an evaluation value reaches a maximum.

FIG. 8 is a diagram illustrating the relative positions of the pixel group G1 and the upper eyelid search window W1 when the evaluation value reaches a maximum. As illustrated in FIG. 8, when the evaluation value reaches a maximum, the upper eyelid search window W1 is in an overlapped state with the pixel group G1. Upon detecting the position of the upper eyelid of the right eye 51, the CPU 21 detects the position of the upper eyelid of the left eye 52 according to a similar procedure.

Figure 9:
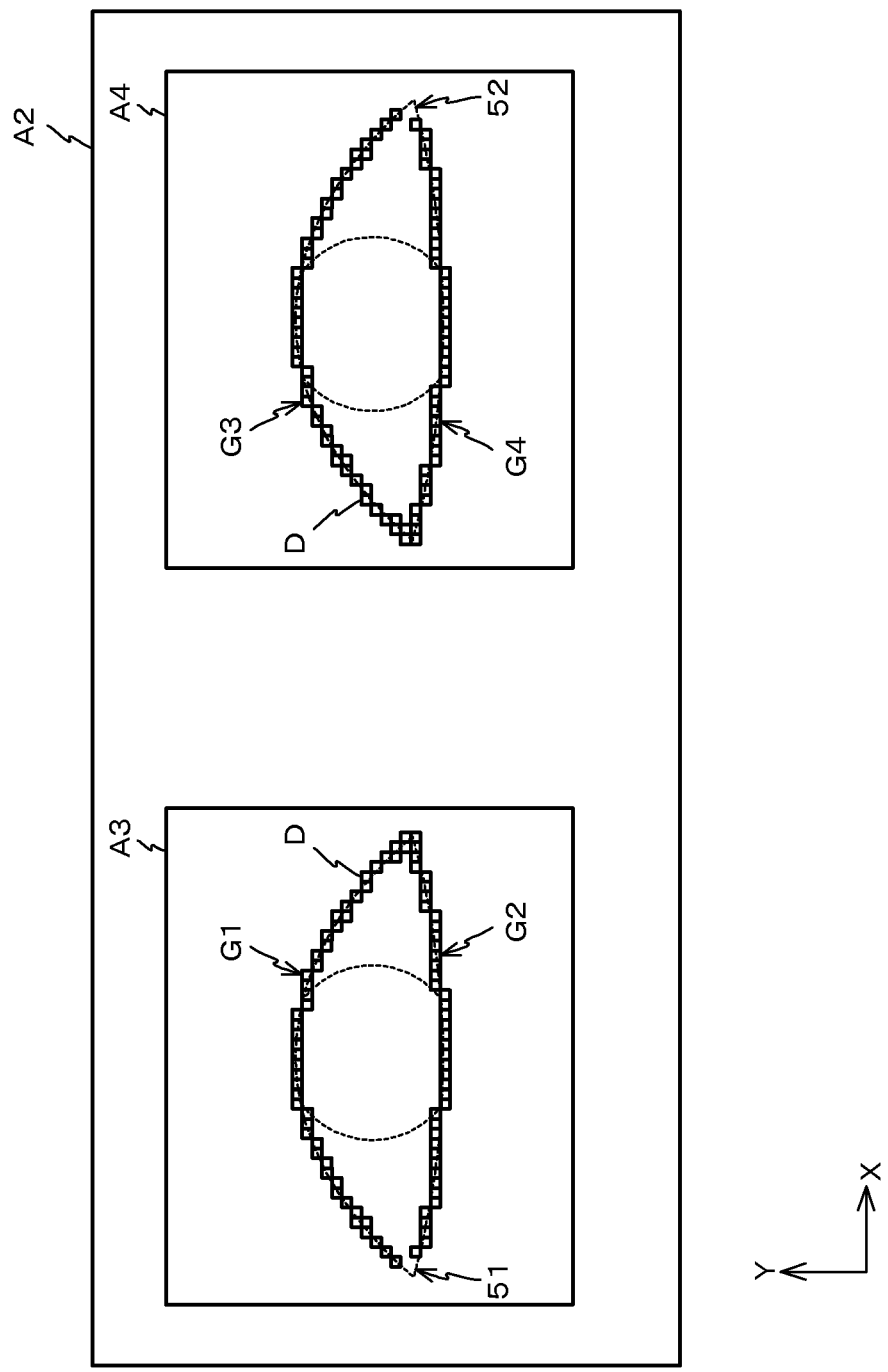
FIG. 9 is a diagram illustrating eyelid search areas.

In the next step S205, the CPU 21 sets an eyelid search area. The lower eyelid is positioned below the upper eyelid. Thus, as illustrated in FIG. 9, the CPU 21 sets an eyelid search area A3 including the upper eyelid and the lower eyelid on the basis of the pixel group G1 constituting the edge of the upper eyelid. Similarly, the CPU 21 sets an eyelid search area A4 on the basis of the pixel group G3.

In the next step S206, the CPU 21 determines the positions of the inner corners and the outer corners of the eyes 51 and 52 inside the eyelid search areas A3 and A4. Specifically, while moving a template TP1 for searching for the inner corner of the eye in distance increments corresponding to one pixel, for example, the CPU 21 calculates a correlation value between the template TP1 and a partial image overlapping the template TP1. The CPU 21 then determines the positions of the template TP1 when the correlation value reaches a maximum to be the positions of the inner corners of the eyes 51 and 52.

Similarly, while moving a template TP2 for searching for the outer corner of the eye, the CPU 21 calculates a correlation value between the template TP2 and a partial image overlapping the template TP2. The CPU 21 then determines the positions of the template TP2 when the correlation value reaches a maximum to be the positions of the outer corners of the eyes 51 and 52.

Figure 10:
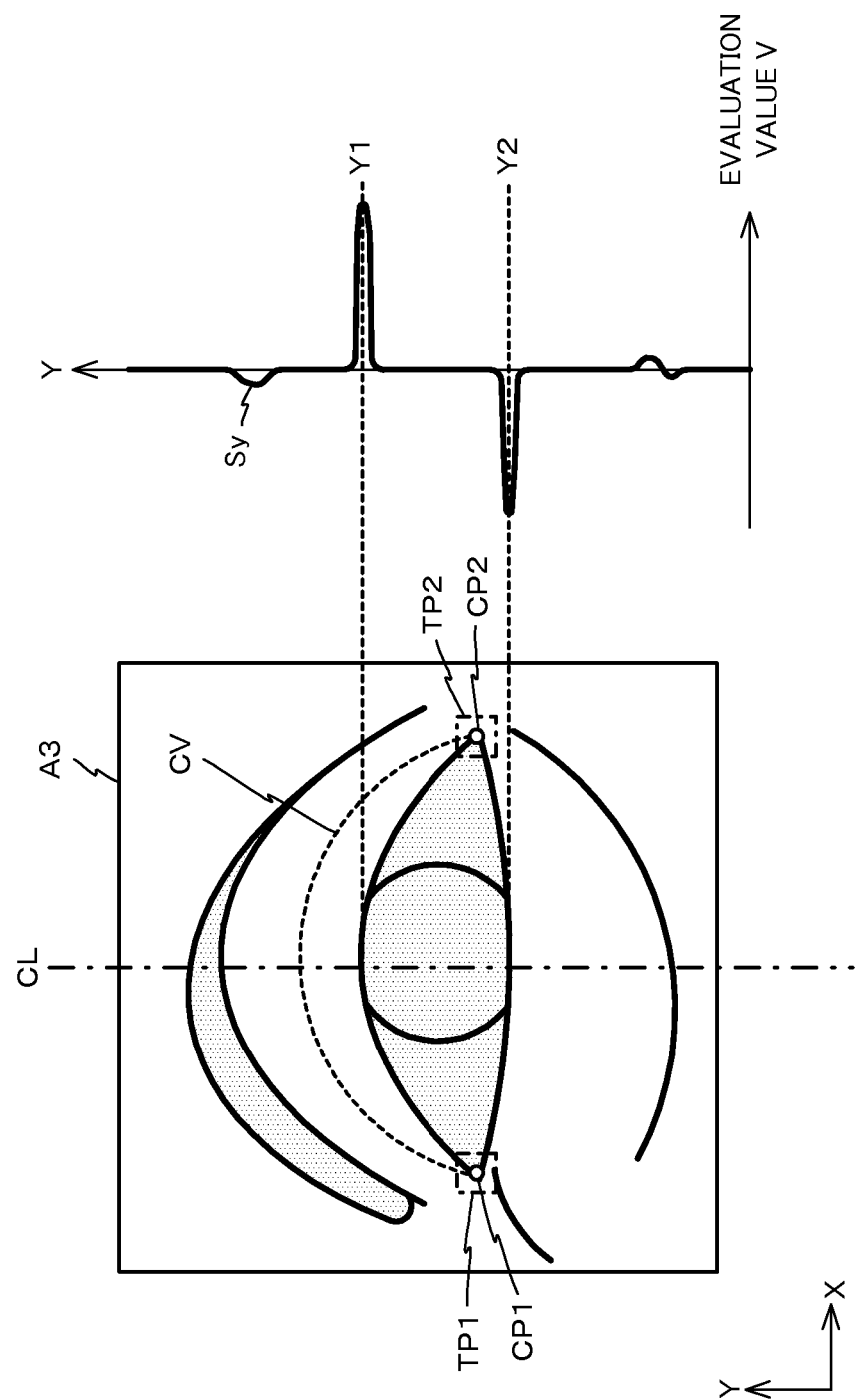
FIG. 10 is a diagram illustrating a relationship between pixels and a characteristic curve.

FIG. 10 illustrates the templates TP1 and TP2 positioned where the partial images and the correlation values reach maxima. As FIG. 10 demonstrates, the CPU 21 determines the positions in the XY coordinate system of the points CP1 and CP2 coinciding with the centers of the templates TP1 and TP2 to be the positions of the inner corners and the outer corners of the eyes 51 and 52.

In the next step S207, the CPU 21 successively defines a secondary curve CV whose ends coincide with the points CP1 and CP2 as a fitting curve, and calculates the sum of the edge values of the pixels overlapping the secondary curve CV as an evaluation value V, as illustrated in FIG. 10. At the same time, the CPU 21 calculates the position of the intersection between the secondary curve CV and a straight line CL, parallel to the Y-axis, that passes through the center of a line segment defined by the point CP1 and the point CP2, for example. The CPU 21 then stores the calculated evaluation value V and position information on the intersection in the auxiliary memory 23 as data (PY, V) made up of the evaluation value V and the Y-coordinate PY of the intersection.

In the next step S208, the CPU 21 generates a characteristic curve Sy defined by the data (PY, V) for the eyes 51 and 52. Specifically, as FIG. 10 demonstrates, the CPU 21 generates a characteristic curve Sy by plotting the points defined by the data (PY, V) in a coordinate system whose vertical axis is the Y-axis, and whose horizontal axis is an axis expressing the evaluation value.

In the next step S209, the CPU 21 sets a reference position for the upper eyelid and the lower eyelid on the basis of the characteristic curve Sy generated in step S208.

The upper eyelid and the lower eyelid curve outward in the forward direction, creating a state in which the eyeball is exposed between the upper eyelid and the lower eyelid. For this reason, the upper eyelid and the lower eyelid depicted in the image IM are made up of pixels with comparatively high luma, as illustrated schematically in FIG. 10. On the other hand, the pupil and sclera portion exposed between the upper eyelid and the lower eyelid is made up of pixels with comparatively low luma. For this reason, in the case of calculating edge values using the operators illustrated in FIGS. 5A and 5B, the evaluation value indicated by the characteristic curve Sy will reach a maximum when the Y-coordinate of the intersection between the secondary curve CV and the straight line CL coincides with the coordinate Y1 of the edge of the upper eyelid on the straight line CL. Also, the evaluation value will reach a minimum when the Y-coordinate of the intersection between the secondary curve CV and the straight line CL coincides with the coordinate Y2 of the edge of the lower eyelid on the straight line CL.

Figure 11:
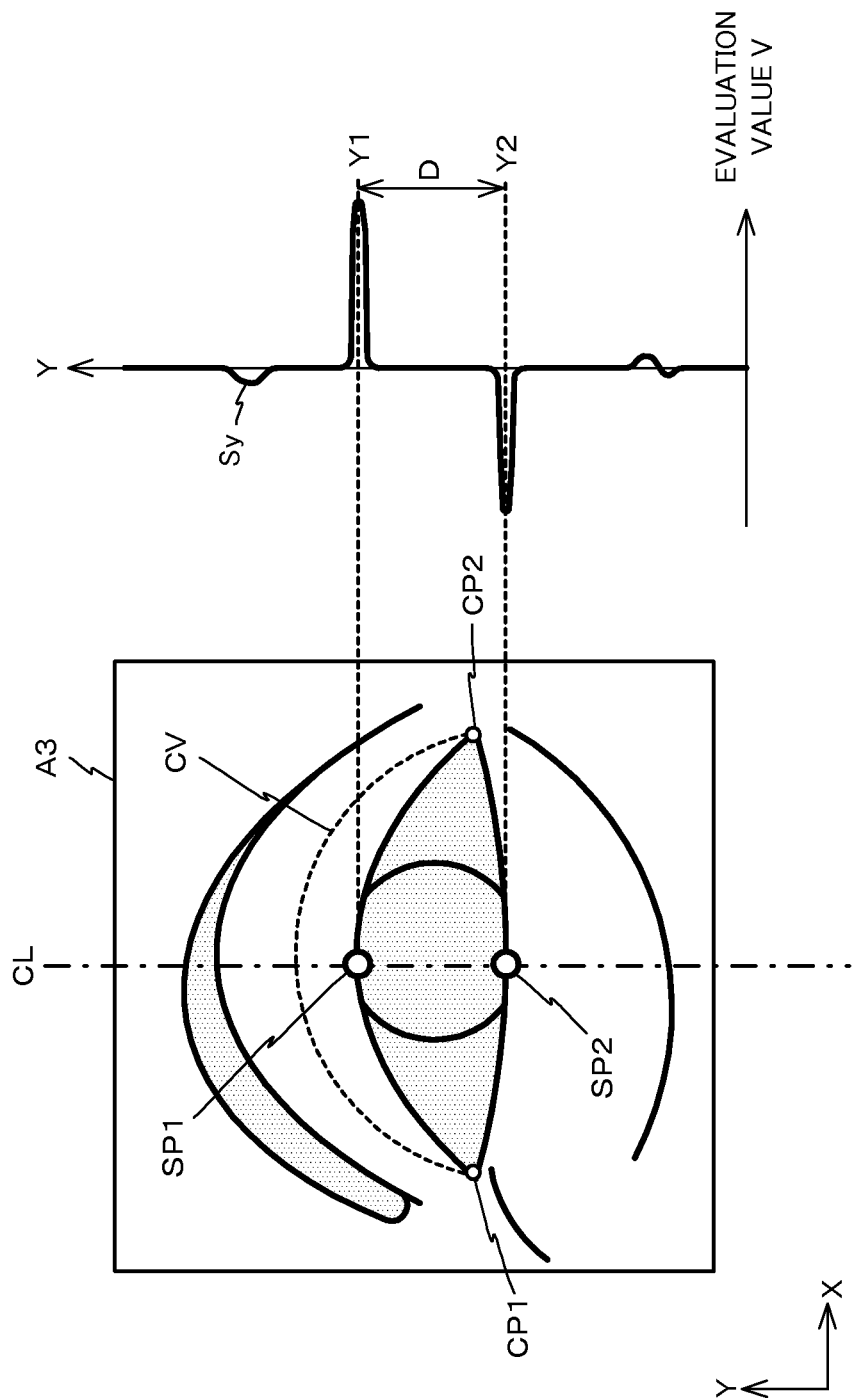
FIG. 11 is a diagram for explaining a reference position setting procedure.

Thus, as illustrated in FIG. 11, the CPU 21 sets a point SP1 positioned on the straight line CL whose Y-coordinate value is Y1 as a reference position for the upper eyelid. Also, the CPU 21 sets a point SP2 positioned on the straight line CL whose Y-coordinate value is Y2 as a reference position for the lower eyelid.

Figure 12:
FIG. 12 is a diagram illustrating an example of an image when the red-eye effect occurs.

As discussed above, the characteristic curve Sy typically has a peak corresponding to the reference position for the upper eyelid, and a peak corresponding to the reference position for the lower eyelid. However, as illustrated in the image of FIG. 12, for example, in the case where the red-eye effect occurs when capturing an image of the eyes, the pupils that would ordinarily be made up of pixels with low luma are made up of a high-luma pixel group HG (see FIG. 13). If edge values are calculated using the operators illustrated in FIGS. 5A and 5B in the case where the red-eye effect occurs, the edge values will decrease on the upper side (+Y side) of the pixel group HG, and the edge values will increase on the lower side (−Y side) of the pixel group HG, as illustrated in FIG. 13.

Figure 13:
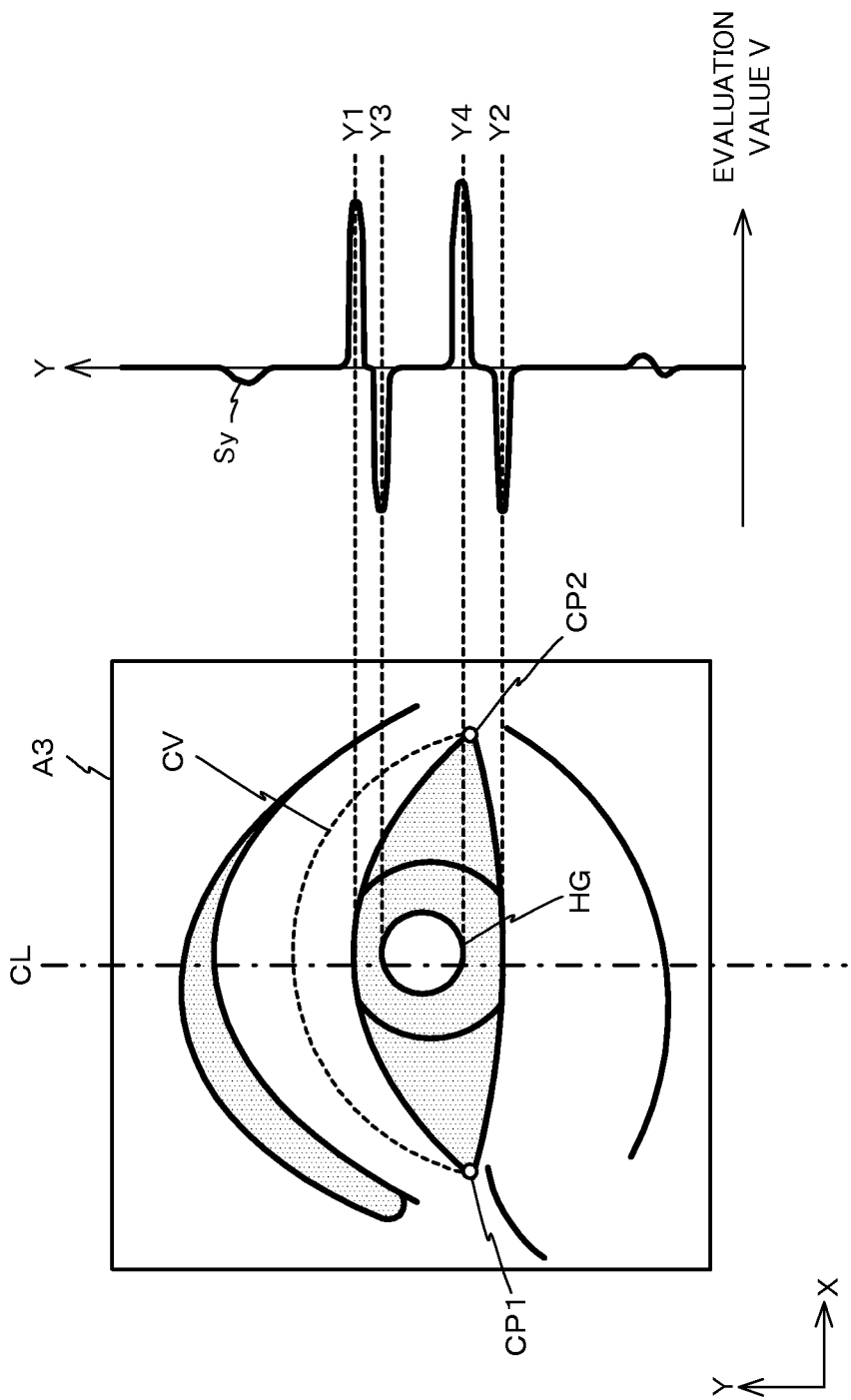
FIG. 13 is a diagram for explaining a reference position setting procedure.

For this reason, if the characteristic curve Sy is generated according to the above procedure, peaks on the positive side will appear at a position corresponding to the boundary between the upper eyelid and the eye, and a position corresponding to the bottom edge of the pixel group HG, as illustrated in FIG. 13. Also, peaks on the negative side will appear at a position corresponding to the top edge of the pixel group HG, and a position corresponding to the boundary between the eye and the lower eyelid. In other words, the characteristic curve Sy becomes a curve in which peaks on the positive side appear at the positions whose Y-coordinate values are Y1 and Y4, and in which peaks on the negative side appear at the positions whose Y-coordinate values are Y2 and Y3.

Figure 14:
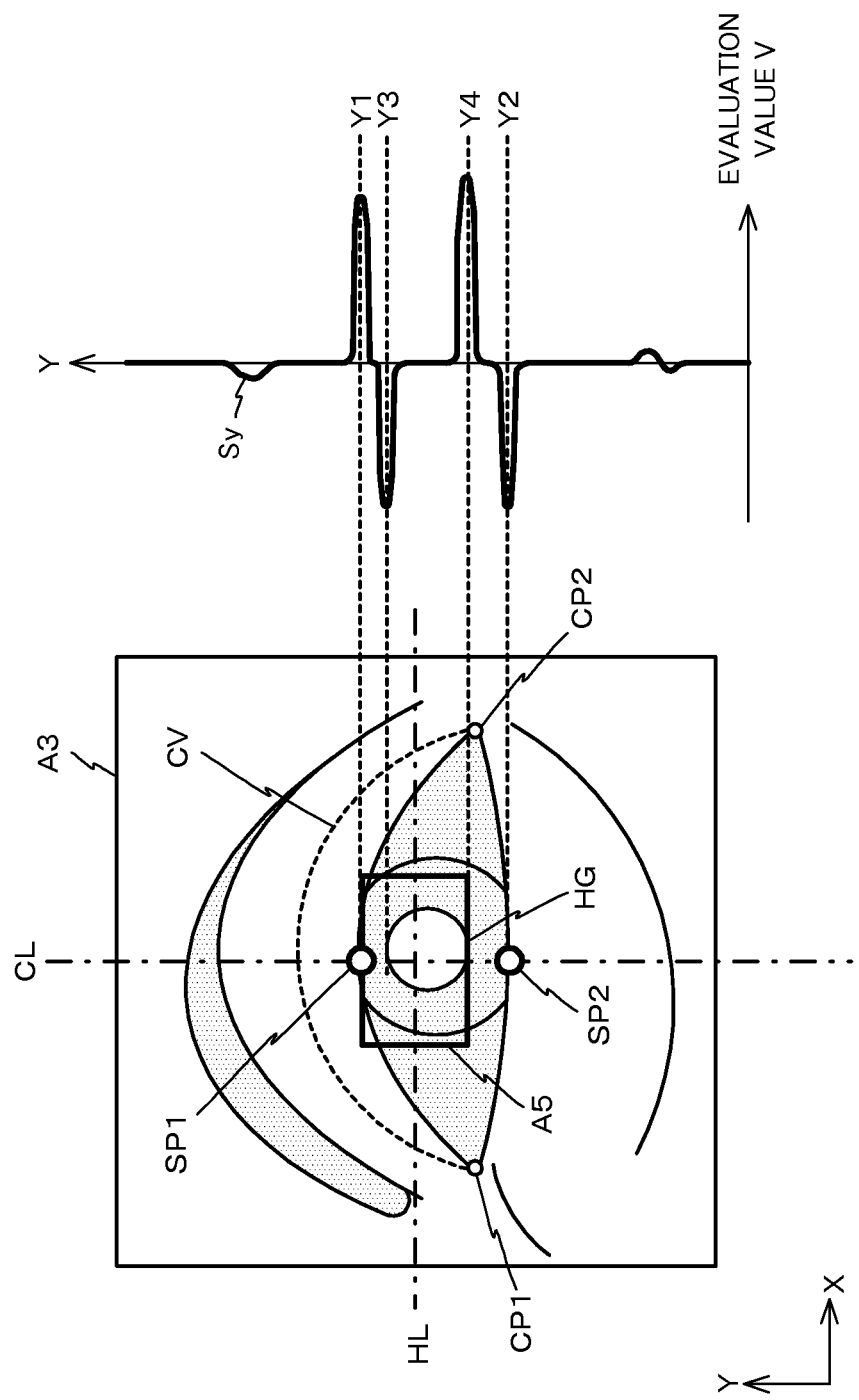
FIG. 14 is a diagram illustrating a search area.

In the case where two peaks appear on the positive side of the characteristic curve Sy, the CPU 21 defines a square search area A5 defined by the two peaks on the positive side as the eyelid search area A3, as illustrated in FIG. 14, for example. For this search area A5, the Y-coordinate at the top edge is Y1, while the Y-coordinate at the bottom edge is Y4. Additionally, the center is positioned on the straight line CL, and the size in the X-axis direction is equal to the difference between Y1 and Y2.

Figure 15:
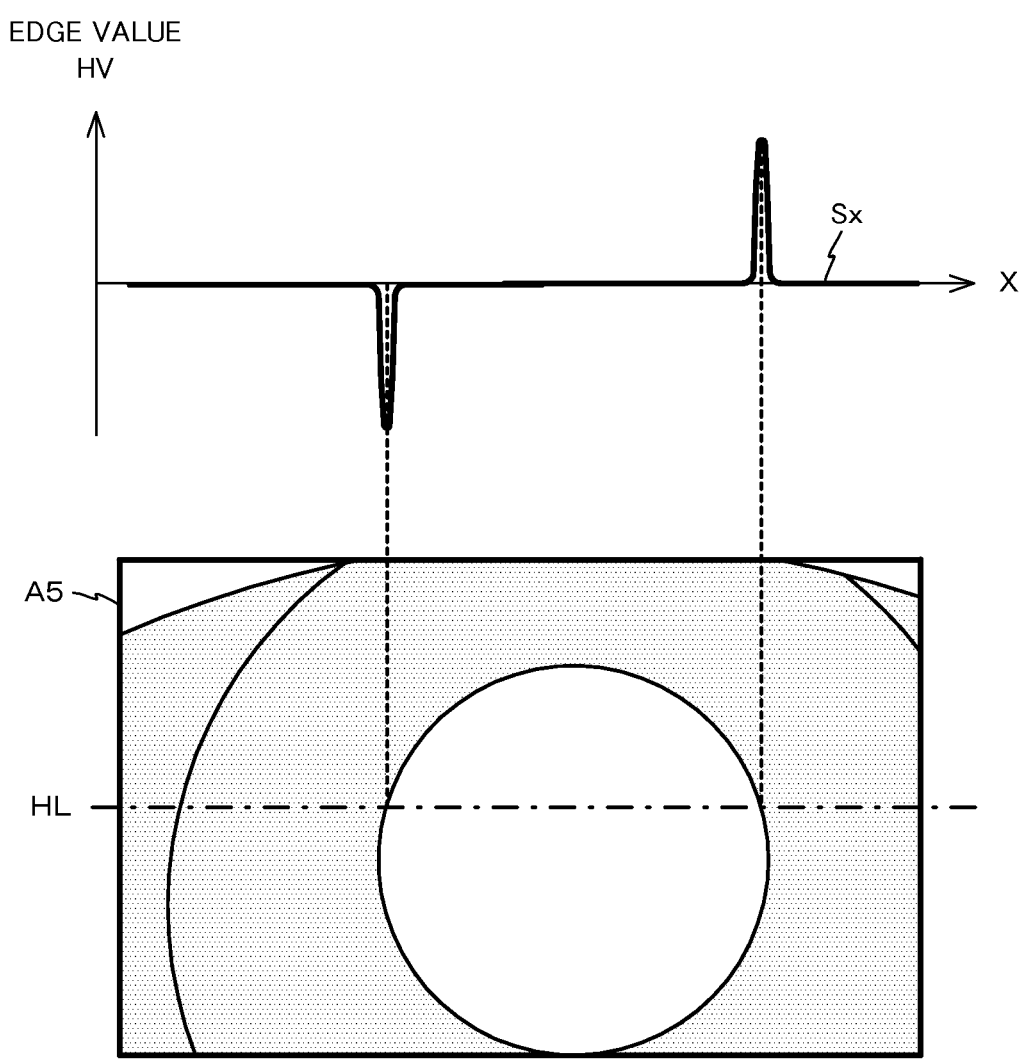
FIG. 15 is a diagram illustrating a relationship between a search area and a characteristic curve.

Upon defining the search area A5, the CPU 21 attempts to detect vertical edges included in the search area A5 using the vertical edge detection operator illustrated in FIG. 5B, for example. Specifically, as FIG. 14 demonstrates, the CPU 21 calculates an edge value EV while moving the vertical edge detection operator along a straight line HL, parallel to the X-axis, that passes through the center of the search area A5. The CPU 21 then plots the points (PX, EV) defined by the calculated edge value HV and the X-coordinate PX of the vertical edge detection operator when that HV was calculated in a coordinate system whose horizontal axis is the X-axis, and whose vertical axis is an axis expressing the edge value. In so doing, the characteristic curve Sx illustrated in FIG. 15 is generated.

Upon generating the characteristic curve Sx, the CPU 21 attempts to detect peaks in the characteristic curve Sx. Subsequently, in the case of detecting peaks in the characteristic curve Sx, the CPU 21 sets a reference position for the upper eyelid, taking the peak on the positive side of the characteristic curve Sy appearing at the position with the larger Y-coordinate as the peak corresponding to the edge of the upper eyelid. For example, in the case where peaks appear on the positive side of the characteristic curve Sy at positions with the Y-coordinates Y1 and Y4, as illustrated in FIG. 14, the CPU 21 sets the point SP1 positioned on the straight line CL whose Y-coordinate value is Y1 as the reference position.

Next, the CPU 21 sets a reference position for the lower eyelid, taking, from among the peaks on the negative side of the characteristic curve Sy, the peak appearing at the position with the smallest Y-coordinate as the peak corresponding to the edge of the lower eyelid. For example, in the case where peaks appear on the negative side of the characteristic curve Sy at positions with the Y-coordinate values Y2 and Y3, as illustrated in FIG. 14, the CPU 21 sets the point SP2 positioned on the straight line CL whose Y-coordinate value is Y2 as the reference position.

The CPU 21 also executes a process similar to the above process for the eyelid search area A4.

Figure 16:
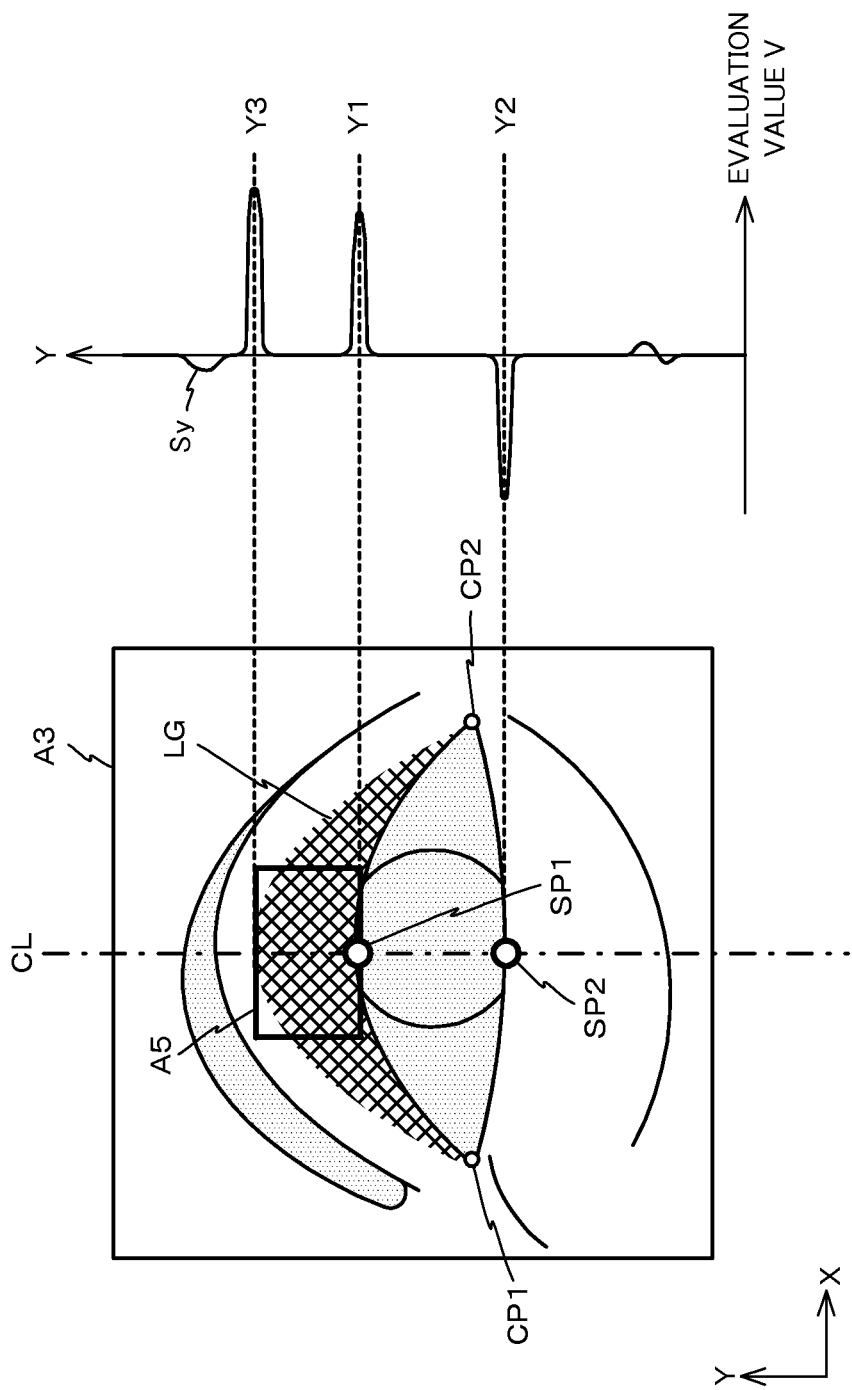
FIG. 16 is a diagram illustrating a relationship between an image and a characteristic curve.

Also, as illustrated in FIG. 16, the CPU 21 similarly defines the search area A5 as the eyelid search area A3 even in the case where two peaks appear on the positive side of the characteristic curve Sy due to the presence of a low-luma pixel group LG1 indicating eye shadow on the upper eyelid, for example. The CPU 21 then conducts computation using the vertical edge detection operator, and subsequently generates a characteristic curve Sx.

When two peaks appear in the characteristic curve Sy due to the presence of a low-luma pixel group LG1 indicating eye shadow, pixels positioned in the search area A5 have a uniform luma. For this reason, peaks do not appear in the characteristic curve Sx. The CPU 21 first attempts to detect peaks in the characteristic curve Sx. As a result, in the case of being unable to detect peaks in the characteristic curve Sx, the CPU 21 sets a reference position for the upper eyelid, taking the peak on the positive side of the characteristic curve Sy appearing at the position with a smaller Y-coordinate as the peak corresponding to the edge of the upper eyelid. For example, in the case where peaks appear on the positive side of the characteristic curve Sy at positions with the Y-coordinates Y1 and Y3, as illustrated in FIG. 16, the CPU 21 sets the point SP1 positioned on the straight line CL whose Y-coordinate value is Y1 as the reference position for the upper eyelid. The CPU 21 then sets the point SP2 positioned on the straight line CL whose Y-coordinate value is Y2 as the reference position for the lower eyelid.

Figure 17:
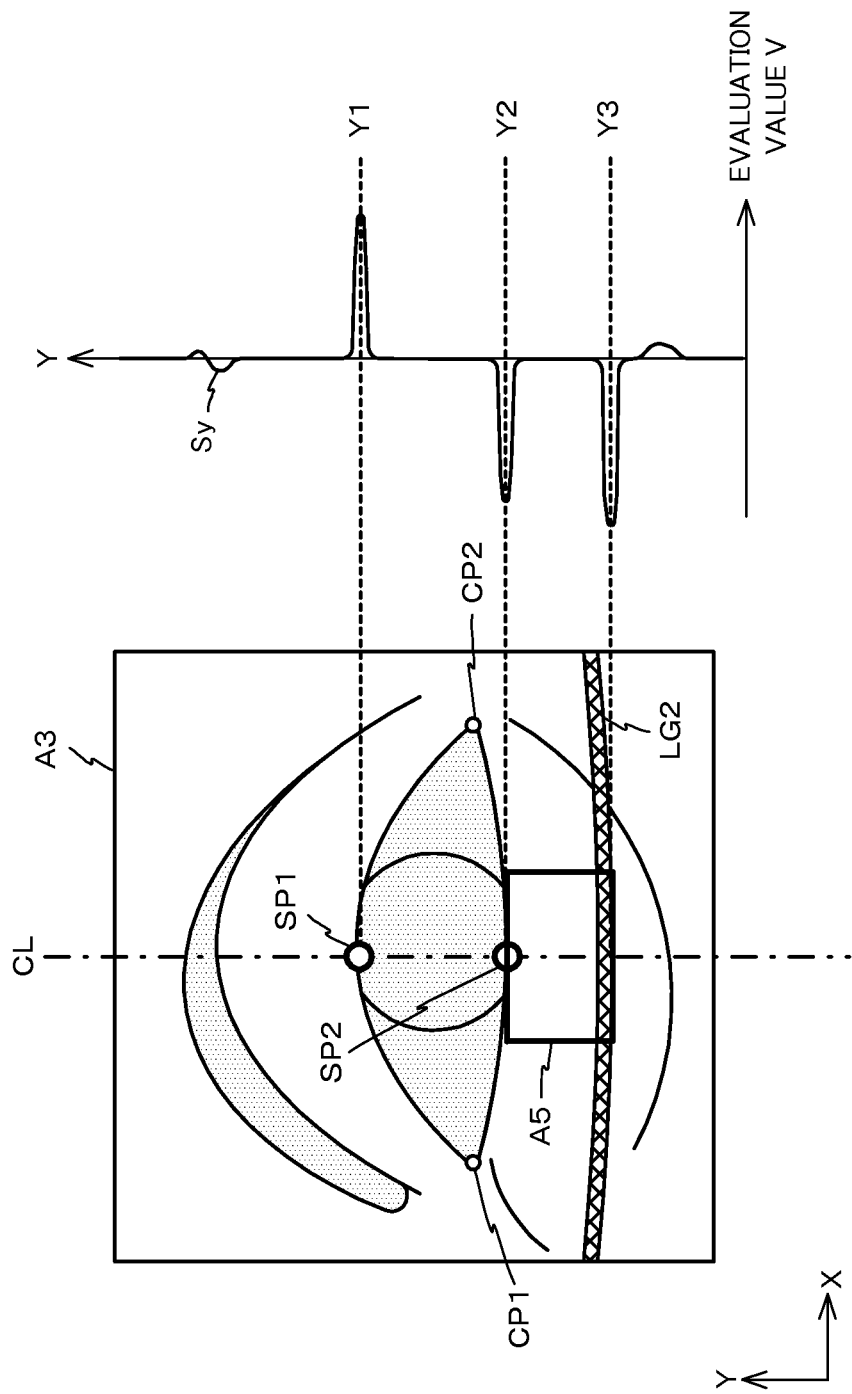
FIG. 17 is a diagram illustrating a relationship between an image and a characteristic curve.

Also, in the case where two peaks appear on the negative side of the characteristic curve Sy due to the presence of a low-luma pixel group LG2 indicating the frames of glasses below the lower eyelids, as illustrated in FIG. 17, for example, the CPU 21 defines a search area A5 defined by the two peaks on the negative side as the eyelid search area A3. The CPU 21 then conducts computation using the vertical edge detection operator, and subsequently generates a characteristic curve Sx.

When two peaks appear in the characteristic curve Sy due to the presence of a low-luma pixel group LG2 indicating the frames of glasses, pixels positioned in the search area A5 have a uniform luma. For this reason, peaks do not appear in the characteristic curve Sx. The CPU 21 first attempts to detect peaks in the characteristic curve Sx. As a result, in the case of being unable to detect peaks in the characteristic curve Sx, the CPU 21 sets a reference position for the lower eyelid, taking the peak on the negative side of the characteristic curve Sy appearing at the position with the larger Y-coordinate as the peak corresponding to the edge of the lower eyelid. For example, in the case where peaks appear on the negative side of the characteristic curve Sy at the positions whose Y-coordinates are Y2 and Y3, as illustrated in FIG. 17, the CPU 21 sets the point SP2 positioned on the straight line CL whose Y-coordinate value is Y2 as the reference position for the lower eyelid. Then, on the basis of the peak corresponding to the edge of the upper eyelid, the CPU 21 sets the point SP1 positioned on the straight line CL whose Y-coordinate value is Y1 as the reference position for the upper eyelid.

In the next step S210, the CPU 21 measures the distance between the point SP1 set as the reference position for the upper eyelid and the point SP2 set as the reference position for the lower eyelid, as FIG. 11 demonstrates, for example. The CPU 21 then outputs a comparison result between this distance and a given threshold value as a degree of opening. Thus, it is possible to make a determination of the alertness of the driver 50, taking the degree of opening as an index.

Upon finishing the processing in step S210, the CPU 21 returns to step S201, and thereafter repeatedly executes the processing from steps S201 to S210.

As described above, in the first embodiment, a secondary curve CV whose ends coincide with the inner corner and the outer corner of the eye is successively defined, and the sum of the edge values of pixels overlapping the secondary curve CV is calculated as an evaluation value V. Next, a characteristic curve Sy is generated on the basis of data (PY, V) made up of the Y-coordinate PY of the intersection between a straight line CL and the secondary curve CV, and the evaluation value V corresponding to the secondary curve CV (step S208). Next, reference positions for the upper eyelids and the lower eyelids of the eyes 51 and 52 are set on the basis of the positions of peaks appearing in the characteristic curve Sy (step S209).

Also, in the case where the characteristic curve Sy includes two peaks on the positive side, a detection is conducted for a pixel group HG occurring because of the red-eye effect in an area defined by the two peaks. Specifically, a search area A5 defined by the two peaks is defined, and a process is conducted to detect vertical edges occurring because of the pixel group HG. Subsequently, in the case of detecting vertical edges occurring because of the pixel group HG from the search area A5, or in other words, in the case of detecting peaks appearing in a characteristic curve Sx, a reference position for the upper eyelid is set on the basis of the peak, from among the peaks on the positive side of the characteristic curve Sy, appearing at the position with the larger Y-coordinate value (step S209).

Consequently, when imaging with the imaging device 30, it is still possible to precisely set reference positions for the eyelids, even if a phenomenon such as the so-called red-eye effect occurs, and edges other than the edges of the eyelids are produced near the edges of the eyelids.

In the present embodiment, in the case where the characteristic curve Sy includes two peaks on the positive side, a detection is conducted for a pixel group HG occurring because of the red-eye effect in an area defined by the two peaks. Specifically, a search area A5 defined by the two peaks is defined, and a process is conducted to detect vertical edges occurring because of the pixel group HG. Subsequently, in the case of not detecting vertical edges occurring because of the pixel group HG from the search area A5, or in other words, in the case of not detecting peaks from a characteristic curve Sx, a reference position for the upper eyelid is set on the basis of the peak, from among the peaks on the positive side of the characteristic curve Sy, appearing at the position with the smaller Y-coordinate value (step S209).

Consequently, it is possible to precisely set reference positions for the eyelids, even if multiple peaks used to set reference positions for the eyelids appear in the characteristic curve Sy due to the driver 50 wearing eye shadow.

In the present embodiment, in the case where the characteristic curve Sy includes two peaks on the negative side, a search area A5 defined by the two peaks is defined, and a process to search for vertical edges occurring because of the pixel group HG is conducted on the search area A5. Subsequently, in the case of not detecting vertical edges occurring because of the pixel group HG from the search area A5, or in other words, in the case of not detecting peaks from the characteristic curve Sx, a reference position for the lower eyelid is set on the basis of the peak, from among the peaks on the negative side of the characteristic curve Sy, appearing at the position with the larger Y-coordinate value (step S209).

Consequently, it is possible to precisely set reference positions for the eyelids, even if multiple peaks used to set reference positions for the eyelids appear in the characteristic curve Sy due to the driver 50 wearing glasses.

(Second Embodiment)

Next, the second embodiment of the present invention will be described with reference to the drawings. Note that like signs will be used for structural elements that are similar or identical to the first embodiment, and the description thereof will be simplified or omitted.

Figure 18:
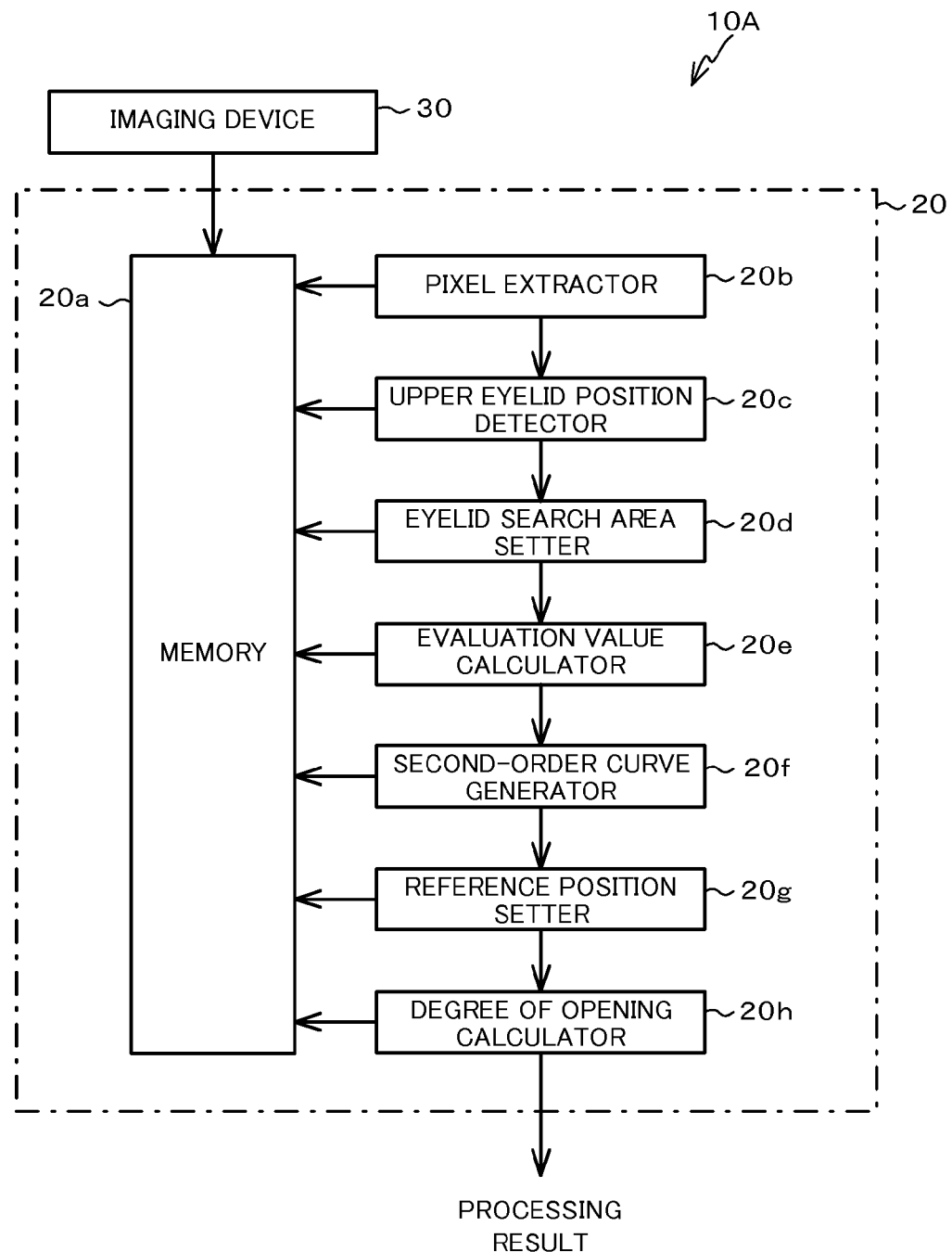
FIG. 18 is a block diagram of an eyelid detection device according to the second embodiment.

An eyelid detection device 10A according to the present embodiment differs from the eyelid detection device 10 according to the first embodiment in that the calculating device 20 is realized by hardware. As illustrated in FIG. 18, the eyelid detection device 10A includes memory 20a, a pixel extractor 20b, an upper eyelid position detector 20c, an eyelid search area setter 20d, an evaluation value calculator 20e, a second-order curve generator 20f, a reference position setter 20g, and a degree of opening calculator 20h.

The memory 20a successively stores information, including information regarding images output from the imaging device 30, processing results by the respective components 20b to 20h, and the like.

The pixel extractor 20b executes image processing using a Sobel filter on an image IM, and extracts edges included in the image IM. Next, the edges indicating the outline F of the face of a driver 50 are detected from among the extracted edges. Next, the edges expressing the eyebrows and mouth of the driver 50 are detected from the edges included in the area enclosed by the outline F of the face of the driver 50, and the positions of the eyebrows and the mouth of the driver 50 are roughly determined. When the positions of the eyebrows and the mouth are determined, the pixel extractor 20b detects the smallest square area that includes the eyebrows and the mouth of the driver 50, and whose size in the X-axis direction approximately coincides with the outline of the face, as the face area A1.

The positions of the eyebrows, eyes, nose, and mouth constituting the face are generally determinable on the basis of the face outline and parts such as either the eyebrows or the eyes, allowing for some individual differences. Consequently, in the face area A1 defined such that the eyebrows are positioned at the top edge and the mouth is positioned at the bottom edge, the area where the eyes are positioned is determined with some degree of accuracy. Thus, the pixel extractor 20b defines a rectangular search area A2 below the image of the eyebrows included in the face area A1, with the longer direction extending in the X-axis direction.

Next, the pixel extractor 20b executes an edge detection process on the search area A2. During edge detection, the pixel extractor 20b uses the horizontal edge detection operator illustrated in FIG. 5A, and the vertical edge detection operator illustrated in FIG. 5B. With this edge detection process, pixels D constituting the edges of the upper eyelids and the lower eyelids of eyes 51 and 52 are extracted, as illustrated in FIG. 6, for example. Hereinafter, the edge of the upper eyelid of the right eye 51 will be designated the pixel group G1, while the edge of the lower eyelid will be designated the pixel group G2. Likewise, the edge of the upper eyelid of the left eye 52 will be designated the pixel group G3, while the edge of the lower eyelid will be designated the pixel group G4.

The upper eyelid position detector 20c detects the position of the upper eyelid by conducting a scan using an upper eyelid search window W1. Specifically, the upper eyelid position detector 20c moves the upper eyelid search window W1 inside the search area A2 in distance increments corresponding to one pixel, for example. The upper eyelid position detector 20c then successively calculates the total of the sum of the edge values of the pixels D simultaneously overlapping the horizontal edge window P1, and the value obtained by subtracting the sum of the edge values of the pixels overlapping the vertical edge window P3 from the sum of the edge values of the pixels D overlapping the vertical edge window P2, as an evaluation value. Subsequently, the upper eyelid position detector 20c detects the position of the upper eyelid search window W1 when the evaluation value reaches a maximum as the position of the upper eyelid of the right eye 51. In addition, the position of the upper eyelid of the left eye 52 is detected according to a similar procedure.

The eyelid search area setter 20d sets an eyelid search area. The lower eyelid is positioned below the upper eyelid. Thus, as illustrated in FIG. 9, the eyelid search area setter 20d sets an eyelid search area A3 including the upper eyelid and the lower eyelid on the basis of the pixel group G1 constituting the edge of the upper eyelid. Similarly, the eyelid search area setter 20d sets an eyelid search area A4 on the basis of the pixel group G3.

The evaluation value calculator 20e moves a template TP1 for searching for the inner corner of the eye in distance increments corresponding to one pixel, for example, while also calculating a correlation value between the template TP1 and a partial image overlapping the template TP1. The evaluation value calculator 20e then determines the positions of the template TP1 when the correlation value reaches a maximum to be the positions of the inner corners of the eyes 51 and 52. Similarly, the evaluation value calculator 20e determines the positions of the outer corners of the eyes 51 and the 52 by using a template TP2 for searching for the outer corner of the eye.

Next, the evaluation value calculator 20e successively defines a secondary curve CV whose ends coincide with the points CP1 and CP2 as a fitting curve, and calculates the sum of the edge values of the pixels overlapping the secondary curve CV as an evaluation value V, as illustrated in FIG. 10. At the same time, the evaluation value calculator 20e calculates the position of the intersection between the secondary curve CV and the straight line CL. The evaluation value calculator 20e then stores the evaluation value V and position information on the intersection in the memory 20a as the data (PY, V).

As FIG. 10 demonstrates, the second-order curve generator 20f generates a characteristic curve Sy by plotting the points defined by the data (PY, V) in a coordinate system whose vertical axis is the Y-axis, and whose horizontal axis is an axis expressing the evaluation value.

The reference position setter 20g sets a reference position for the upper eyelid and the lower eyelid on the basis of the characteristic curve Sy. Specifically, as illustrated in FIG. 11, the reference position setter 20g sets a point SP1 positioned on the straight line CL whose Y-coordinate value is Y1 as a reference position for the upper eyelid. Also, the reference position setter 20g sets a point SP2 positioned on the straight line CL whose Y-coordinate value is Y2 as a reference position for the lower eyelid.

The characteristic curve Sy typically has a peak corresponding to the reference position for the upper eyelid, and a peak corresponding to the reference position for the lower eyelid. However, as illustrated in the image of FIG. 12, for example, in the case where the red-eye effect occurs when capturing an image of the eyes, the pupils that would ordinarily be made up of pixels with low luma are made up of a high-luma pixel group HG (see FIG. 13). If edge values are calculated using the operators illustrated in FIGS. 5A and 5B in the case where the red-eye effect occurs, the edge values will decrease on the upper side (+Y side) of the pixel group HG, and the edge values will increase on the lower side (−Y side) of the pixel group HG, as illustrated in FIG. 13. In this case, the characteristic curve Sy becomes a curve in which peaks on the positive side appear at the positions whose Y-coordinate values are Y1 and Y4, and in which peaks on the negative side appear at the positions whose Y-coordinate values are Y2 and Y3.

In such cases, the reference position setter 20g defines a square search area A5 defined by the two peaks on the positive side as the eyelid search area A3, as illustrated in FIG. 14, for example. Next, the reference position setter 20g attempts to detect vertical edges included in the search area A5 using the vertical edge detection operator illustrated in FIG. 5B, for example. Specifically, as FIG. 14 demonstrates, the reference position setter 20g calculates an edge value EV while moving the vertical edge detection operator along a straight line HL, parallel to the X-axis, that passes through the center of the search area A5. The reference position setter 20g then plots the points (PX, EV) defined by the calculated edge value HV and the X-coordinate PX of the vertical edge detection operator when that HV was calculated in a coordinate system whose horizontal axis is the X-axis, and whose vertical axis is an axis expressing the edge value. In so doing, the characteristic curve Sx illustrated in FIG. 15 is generated.

Upon generating the characteristic curve Sx, the reference position setter 20g attempts to detect peaks in the characteristic curve Sx. Subsequently, in the case of detecting peaks in the characteristic curve Sx, the reference position setter 20g sets a reference position for the upper eyelid, taking the peak on the positive side appearing at the position with the larger Y-coordinate of the characteristic curve Sy as the peak corresponding to the edge of the upper eyelid. For example, in the case where peaks appear on the positive side of the characteristic curve Sy at positions with the Y-coordinates Y1 and Y4, as illustrated in FIG. 14, the reference position setter 20g sets the point SP1 positioned on the straight line CL whose Y-coordinate value is Y1 as the reference position.

Next, the reference position setter 20g sets a reference position for the lower eyelid, taking, from among the peaks on the negative side of the characteristic curve Sy, the peak appearing at the position with the smallest Y-coordinate as the peak corresponding to the edge of the lower eyelid. For example, in the case where peaks appear on the negative side of the characteristic curve Sy at positions with the Y-coordinate values Y2 and Y3, as illustrated in FIG. 14, the reference position setter 20g sets the point SP2 positioned on the straight line CL whose Y-coordinate value is Y2 as the reference position.

The reference position setter 20g also executes a process similar to the above process for the eyelid search area A4.

Also, as illustrated in FIG. 16, the reference position setter 20g similarly defines the search area A5 as the eyelid search area A3 even in the case where two peaks appear on the positive side of the characteristic curve Sy due to the presence of a low-luma pixel group LG1 indicating eye shadow on the upper eyelid, for example. The reference position setter 20g then conducts computation using the vertical edge detection operator, and subsequently generates a characteristic curve Sx.

Next, the reference position setter 20g attempts to detect peaks in the characteristic curve Sx. As a result, in the case of being unable to detect peaks in the characteristic curve Sx, the reference position setter 20g sets a reference position for the upper eyelid, taking the peak on the positive side of the characteristic curve Sy appearing at the position with a smaller Y-coordinate as the peak corresponding to the edge of the upper eyelid. For example, in the case where peaks appear on the positive side of the characteristic curve Sy at positions with the Y-coordinates Y1 and Y3, as illustrated in FIG. 16, the reference position setter 20g sets the point SP1 positioned on the straight line CL whose Y-coordinate value is Y1 as the reference position for the upper eyelid. On the basis of the peak corresponding to the edge of the lower eyelid, the reference position setter 20g then sets the point SP2 positioned on the straight line CL whose Y-coordinate value is Y2 as the reference position for the lower eyelid.

Also, in the case where two peaks appear on the negative side of the characteristic curve Sy due to the presence of a low-luma pixel group LG2 indicating the frames of glasses below the lower eyelids, as illustrated in FIG. 17, for example, the reference position setter 20g defines a search area A5 defined by the two peaks on the negative side as the eyelid search area A3. The reference position setter 20g then conducts computation using the vertical edge detection operator, and subsequently generates a characteristic curve Sx.

Next, the reference position setter 20g attempts to detect peaks in the characteristic curve Sx. As a result, in the case of being unable to detect peaks in the characteristic curve Sx, the reference position setter 20g sets a reference position for the lower eyelid, taking the peak on the negative side of the characteristic curve Sy appearing at the position with the larger Y-coordinate as the peak corresponding to the edge of the lower eyelid. For example, in the case where peaks appear on the negative side of the characteristic curve Sy at the positions whose Y-coordinates are Y2 and Y3, as illustrated in FIG. 17, the reference position setter 20g sets the point SP2 positioned on the straight line CL whose Y-coordinate value is Y2 as the reference position for the lower eyelid. Then, on the basis of the peak corresponding to the edge of the upper eyelid, the reference position setter 20g sets the point SP1 positioned on the straight line CL whose Y-coordinate value is Y1 as the reference position for the upper eyelid.

The degree of opening calculator 20h measures the distance between the point SP1 set as the reference position for the upper eyelid and the point SP2 set as the reference position for the lower eyelid, as FIG. 11 demonstrates, for example. The degree of opening calculator 20h then outputs a comparison result between this distance and a given threshold value as a degree of opening. Thus, it is possible to make a determination of the alertness of the driver 50, taking the degree of opening as an index.

As described above, in the second embodiment, a secondary curve CV whose ends coincide with the inner corner and the outer corner of the eye is successively defined, and the sum of the edge values of pixels overlapping the secondary curve CV is calculated as an evaluation value V. Next, a characteristic curve Sy is generated on the basis of data (PY, V) made up of the Y-coordinate PY of the intersection between a straight line CL and the secondary curve CV, and the evaluation value V corresponding to the secondary curve CV. Subsequently, reference positions for the upper eyelids and the lower eyelids of the eyes 51 and 52 are set on the basis of the positions of peaks appearing in the characteristic curve.

Also, in the case where the characteristic curve Sy includes two peaks on the positive side, a detection is conducted for vertical edges occurring because of the red-eye effect in the search area A5 defined by the two peaks. Subsequently, in the case of detecting vertical edges from the search area A5, a reference position for the upper eyelid is set on the basis of the peak, from among the peaks of the characteristic curve Sy, appearing at the position with the larger Y-coordinate value.

Consequently, when imaging with the imaging device 30, it is still possible to precisely set reference positions for the eyelids, even if a phenomenon such as the so-called red-eye effect occurs, and edges other than the edges of the eyelids are produced near the edges of the eyelids.

In the present embodiment, in the case where the characteristic curve Sy includes two peaks on the positive side, a detection is conducted for vertical edges occurring because of the red-eye effect in the search area A5 defined by the two peaks. Subsequently, in the case of not detecting vertical edges occurring because of the pixel group HG from the search area A5, a reference position for the upper eyelid is set on the basis of the peak, from among the peaks of the characteristic curve Sy, appearing at the position with the smaller Y-coordinate value.

Consequently, it is possible to precisely set reference positions for the eyelids, even if multiple peaks used to set reference positions for the eyelids appear in the characteristic curve Sy due to the driver 50 wearing eye shadow.

In the present embodiment, in the case where the characteristic curve Sy includes two peaks on the negative side, a vertical edge detection process is conducted in a search area A5 defined by the two peaks. Subsequently, in the case of not detecting vertical edges from the search area A5, a reference position for the lower eyelid is set on the basis of the peak, from among the peaks on the negative side of the characteristic curve Sy, appearing at the position with the larger Y-coordinate value.

Consequently, it is possible to precisely set reference positions for the eyelids, even if multiple peaks used to set reference positions for the eyelids appear in the characteristic curve Sy due to the driver 50 wearing glasses.

The foregoing thus describes embodiments of the present invention, but the present invention is not limited to the foregoing embodiments.

For example, in the foregoing embodiments, in the case where the characteristic curve Sy includes two peaks on the positive side, an attempt is made to detect a pixel group HG occurring because of the red-eye effect by executing a vertical edge detection process on a search area A5 defined by the two peaks. However, the above is not limiting, and it is also possible to extract pixels from the eyelid search area A4 whose luma has increased because of the red-eye effect, and attempt to detect a pixel group HG present in the search area A5 on the basis of the pixel extraction results. In this case, pixels whose luma is equal to or greater than a threshold value are extracted from the search area A5, and the pixel group HG is determined to exist in the case where an area defined by the extracted pixels becomes equal to or greater than a given reference value.

The foregoing embodiments describe the case where the search area A5 is defined on the basis of peaks on the positive side of the characteristic curve Sy, as illustrated in FIG. 14, for example. However, the above is not limiting, and it is also possible to define the search area A5 on the basis of peaks on the negative side of the characteristic curve Sy. For the search area A5 in this case, the Y-coordinate at the top edge becomes Y3, while the Y-coordinate at the bottom edge becomes Y2. For this reason, in the case of detecting the pixel group HG from the search area A5, the point positioned on the straight line CL whose Y-coordinate is Y2 is set as the reference position for the lower eyelid. Subsequently, the point positioned on the straight line CL and corresponding to the peak having the largest Y-coordinate value from among the peaks of the characteristic curve Sy is set as the reference position for the upper eyelid.

In the foregoing embodiments, a characteristic curve Sy exhibiting a peak corresponding to a reference position for the upper eyelid and a peak corresponding to a reference position for the lower eyelid is calculated, and the respective reference positions are set on the basis of the characteristic curve Sy. However, the above is not limiting, and it is also possible to respectively execute the setting of a reference position for the upper eyelid and the setting of a reference position for the lower eyelid independently of each other.

In the foregoing embodiments, a secondary curve CV is successively defined, and an evaluation value is calculated on the basis of the edge values of pixels overlapping the second-order curve. However, the above is not limiting, and it is also possible to define a third-order or higher-order curve as the fitting curve, and calculate an evaluation value on the basis of the edge values of pixels overlapping the fitting curve. It is also possible to successively define a curve that resembles the eyelid edge, and calculate an evaluation value on the basis of the edge values of pixels overlapping the curve.

In the foregoing embodiments, a characteristic curve is generated on the basis of the Y-coordinate of the intersection between the secondary curve CV and a straight line CL passing through the center of a line segment defined by the points CP1 and CP2, and an evaluation value V corresponding to that secondary curve CV. However, the above is not limiting, and it is also possible to generate a characteristic curve on the basis of the Y-coordinate of the intersection between the secondary curve CV and an arbitrary straight line positioned between the points CP1 and CP2, and an evaluation value V corresponding to that secondary curve CV.

In the foregoing embodiments, a sum of edge values is taken to be the evaluation value. However, the above is not limiting, and it is also possible to calculate an evaluation value that takes into account both the positions and edge values of pixels, for example. Besides the above, it is also possible to use various indices as the evaluation value.

The functions of a calculating device 20 according to the foregoing embodiments are realizable by specialized hardware, but are also realizable by an ordinary computer system.

It is possible to store and distribute a program to be stored in the auxiliary memory 23 of the calculating device 20 in the foregoing first embodiment on a computer-readable recording medium such as a flexible disk, a Compact Disc-Read-Only Memory (CD-ROM), a Digital Versatile Disc (DVD), or a magneto-optical disc (MO). A device that executes the processing discussed earlier is realized by installing the program onto a computer.

Additionally, it is possible to store the program on a device such as a disk drive included in a given server on a communication network such as the Internet, to be downloaded or otherwise communicated to a computer by being impressed onto a carrier wave, for example.

The program is also potentially activated and executed while being transferred via a communication network.

In addition, it is possible to cause all or part of the program to be executed on a server, with the image processing discussed earlier being executed while transmitting and receiving information regarding such processing via a communication network.

Note that in cases such as where the functions discussed above are realized by an operating system (OS) or by cooperative action between an OS and an application, it is possible for only the portion other than OS to be stored and distributed on a medium, or alternatively, downloaded or otherwise communicated to a computer.

Note that various embodiments and modifications of the present invention are possible without departing from the spirit and scope of the present invention in the broad sense. Moreover, the foregoing embodiments are for the purpose of describing the present invention, and do not limit the scope of the present invention.

INDUSTRIAL APPLICABILITY

An eyelid detection device, eyelid detection method, and program of the present invention is applicable to the detection of reference positions for eyelids.

REFERENCE SIGNS LIST 10, 10A Eyelid detection device
20 Calculating device
20a Memory
20b Pixel extractor
20c Upper eyelid position detector
20d Eyelid search area setter 20e Evaluation value calculator
20f Second-order curve generator
20g Reference position setter
20h Degree of opening calculator
21 CPU
22 Primary memory
23 Auxiliary memory
24 Display
25 Input device
26 Interface
27 System bus
30 Imaging device
50 Driver
51 Right eye
52 Left eye
A1 Face area
A2 Search area
A3, A4 Eyelid search area
A5 Search area
CV Secondary curve
CP1, CP2 Point
D Pixel
F Outline
G1 to G4, HG Pixel group
HG Pixel group
LG1, LG2 Low-luma pixel group
IM Image
P1 Horizontal edge window
P2, P3 Vertical edge window
Sx, Sy Characteristic curve
SP1, SP2 Point
TP1, TP2 Template
W1 Upper eyelid search window
CL, HL Straight line

The invention claimed is:

1. An eyelid detection device comprising:
a edge value calculator that calculates edge values for pixels constituting an image depicting a driver's eye;
a evaluation value calculator that successively defines a fitting curve, one end of which coincides with an inner corner of the eye depicted in the image, and the other end of which coincides with an outer corner of the eye depicted in the image, and calculates an evaluation value indicating a degree to which the fitting curve coincides with an edge of an eyelid of the eye;
a characteristic curve generator that generates a characteristic curve indicating change in the evaluation value, on the basis of computation results from the evaluation value calculator;
a determinator that, in the case of detecting two peaks whose vertices are maxima of the characteristic curve, or in the case of detecting two peaks whose vertices are minima of the characteristic curve, determines whether or not an area on the image defined by the two peaks includes an area occurring because of a red-eye effect; and
a setter that sets a reference position for the eyelid, on the basis of a determination result from the determinator.

2. The eyelid detection device according to claim 1, wherein
the determinator executes a process for detecting vertical edges in the area on the image defined by the peaks, and in the case of detecting the vertical edges, determines that the area includes an area occurring because of the red-eye effect.

3. The eyelid detection device according to claim 1, wherein
the determinator determines whether or not the area includes an area occurring because of the red-eye effect on the basis of luma information for pixels included in the area on the image defined by the peaks.

4. The eyelid detection device according to claim 1, wherein
the two peaks are peaks corresponding to an upper eyelid of the driver, and
the setter, in the case where the determinator determines that the area includes a area occurring because of the red-eye effect, sets a point on the image corresponding to the peak at a high position from among the two peaks as a reference position for an upper eyelid.

5. The eyelid detection device according to claim 1, wherein
the two peaks are peaks corresponding to an upper eyelid of the driver, and
the setter, in the case where the determinator determines that the area does not include a area occurring because of the red-eye effect, sets a point on the image corresponding to the peak at a low position from among the two peaks as a reference position for an upper eyelid.

6. The eyelid detection device according to claim 1, wherein
the two peaks are peaks corresponding to a lower eyelid of the driver, and
the setter, in the case where the determinator determines that the area includes an area occurring because of the red-eye effect, sets a point on the image corresponding to the peak at a low position from among the two peaks as a reference position for a lower eyelid.

7. The eyelid detection device according to claim 1, wherein
the two peaks are peaks corresponding to a lower eyelid of the driver, and
the setter, in the case where the determinator determines that the area does not include an area occurring because of the red-eye effect, sets a point on the image corresponding to the peak at a high position from among the two peaks as a reference position for a lower eyelid.

8. The eyelid detection device according to claim 1, wherein
the two peaks are peaks corresponding to a lower eyelid of the driver, and
the setter, in the case where the determinator determines that the area includes an area occurring because of the red-eye effect, and in addition, two peaks corresponding to an upper eyelid of the driver are detected, sets a point on the image corresponding to the peak at a high position from among the two peaks corresponding to an upper eyelid of the driver as a reference position for an upper eyelid.

9. The eyelid detection device according to claim 1, wherein
the two peaks are peaks corresponding to a lower eyelid of the driver, and
the setter, in the case where the determinator determines that the area does not include an area occurring because of the red-eye effect, and in addition, two peaks corresponding to an upper eyelid of the driver are detected, sets a point on the image corresponding to the peak at a low position from among the two peaks corresponding to an upper eyelid of the driver as a reference position for an upper eyelid.

10. The eyelid detection device according to claim 1, wherein
the two peaks are peaks corresponding to an upper eyelid of the driver, and
the setter, in the case where the determinator determines that the area includes an area occurring because of the red-eye effect, and in addition, two peaks corresponding to a lower eyelid of the driver are detected, sets a point on the image corresponding to the peak at a low position from among the two peaks corresponding to a lower eyelid of the driver as a reference position for a lower eyelid.

11. The eyelid detection device according to claim 1, wherein
the two peaks are peaks corresponding to an upper eyelid of the driver, and
the setter, in the case where the determinator determines that the area does not include an area occurring because of the red-eye effect, and in addition, two peaks corresponding to a lower eyelid of the driver are detected, sets a point on the image corresponding to the peak at a high position from among the two peaks corresponding to a lower eyelid of the driver as a reference position for a lower eyelid.

12. An eyelid detection method comprising:
calculating edge values of pixels constituting an image depicting a driver's eye;
defining a fitting curve, one end of which coincides with an inner corner of the eye depicted in the image, and the other end of which coincides with an outer corner of the eye depicted in the image;
calculating an evaluation value indicating a degree to which the fitting curve coincides with an edge of an eyelid of the eye;
generating a characteristic curve indicating change in the evaluation value, on the basis of the computation results from the evaluation value ;
in the case of detecting two peaks whose vertices are maxima of the characteristic curve, or in the case of detecting two peaks whose vertices are minima of the characteristic curve, determining whether or not an area on the image defined by the two peaks includes an area occurring because of a red-eye effect; and
setting a reference position for the eyelid, on the basis of a result from the determination.

13. A non-transitory recording medium on which is recorded a program causing a computer to execute a procedure comprising:
calculating edge values of pixels constituting an image depicting a driver's eye;
defining a fitting curve, one end of which coincides with an inner corner of the eye depicted in the image, and the other end of which coincides with an outer corner of the eye depicted in the image;
calculating an evaluation value indicating a degree to which the fitting curve coincides with an edge of an eyelid of the eye;
generating a characteristic curve indicating change in the evaluation value, on the basis of the computation results from the evaluation value ;
in the case of detecting two peaks whose vertices are maxima of the characteristic curve, or in the case of detecting two peaks whose vertices are minima of the characteristic curve, determining whether or not an area on the image defined by the two peaks includes an area occurring because of a red-eye effect; and
setting a reference position for the eyelid, on the basis of a result from the determination.

* * * * *